United States Patent [19]
Crunkelton

[11] Patent Number: 5,966,915
[45] Date of Patent: Oct. 19, 1999

[54] FRUIT HARVESTING MACHINE

[76] Inventor: William S. Crunkelton, 306 N. Ruth Rd., Avon Park, Fla. 33825

[21] Appl. No.: 08/941,608

[22] Filed: Sep. 30, 1997

[51] Int. Cl.[6] .................................................. A01D 46/24
[52] U.S. Cl. .............................. 56/328.1; 56/329; 56/330
[58] Field of Search ............................... 56/328.1, 327.1, 56/329, 330, 331, 340.1

[56] References Cited

U.S. PATENT DOCUMENTS

| | | | |
|---|---|---|---|
| 3,713,282 | 1/1973 | Baker | 56/328.1 |
| 4,377,064 | 3/1983 | Peterson | 56/328.1 |
| 5,161,358 | 11/1992 | Crunkelton | 56/328.1 |
| 5,428,947 | 7/1995 | Visser | 56/328.1 |
| 5,666,795 | 9/1997 | Wilkinson | 56/328.1 |

Primary Examiner—Terry Lee Melius

[57] ABSTRACT

A fruit harvesting machine is provided which may mechanically harvest fruit from fruit trees. Means are provided for a transport assembly to carry an arm housing member which has installed thereon a plurality of arms. The arm housing member provides for repetitive displacement of the arms into and out of a canopy of the fruit trees. Means are provided for arms to deflect during insertion and withdrawal relative to the arm housing member in the event that the respective arm encounters a deflecting obstruction. Means are provided for arms to yield during insertion relative to the arm housing member in the event that the respective arm encounters an impacting obstruction. These actions, both the deflecting and the yielding, act to prevent damage to either the fruit tree or the machine. A plurality of picking fingers, each having unique engaging qualities, extend from each arm. These picking fingers allow for engagement of fruit during a withdrawal action to produce a picking pressure during subsequent withdrawal of the arm following engagement of the fruit. Means are provided to catch the severed fruit prior to contact with the earthen ground for subsequent transfer to a storage or transport container. Automation of the harvesting process allows for the most efficient operation of the harvesting machine by eliminating lag times associated with human control of such operations.

19 Claims, 17 Drawing Sheets

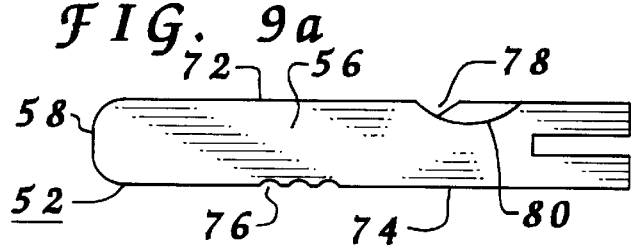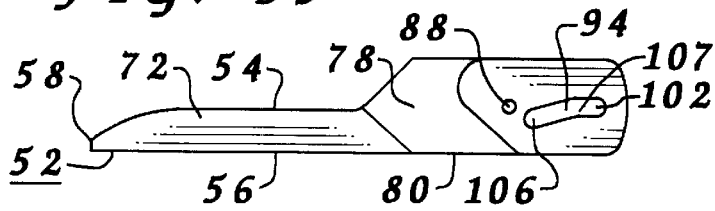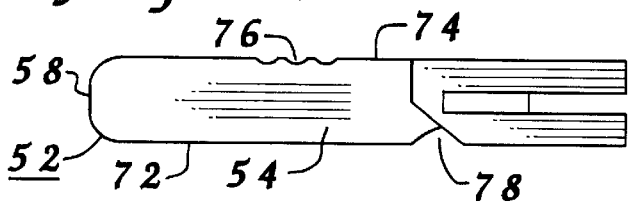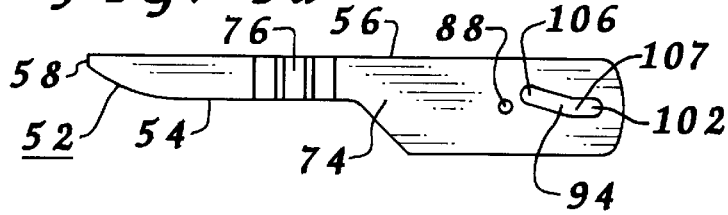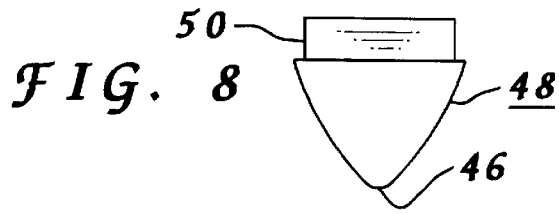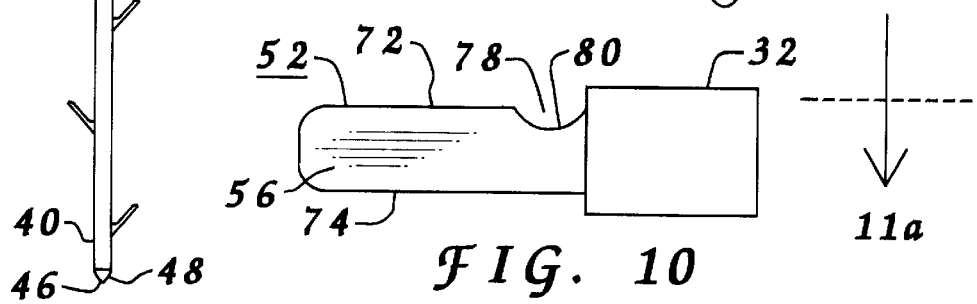

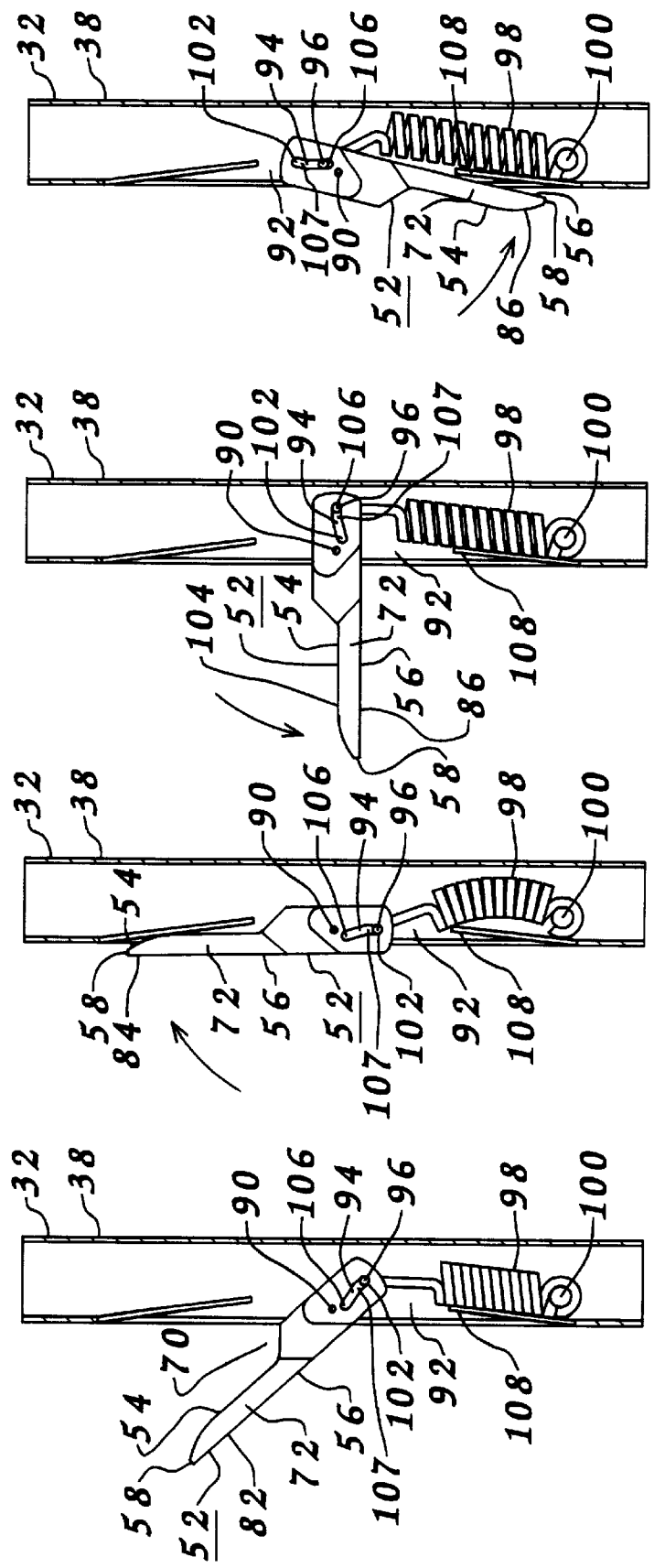

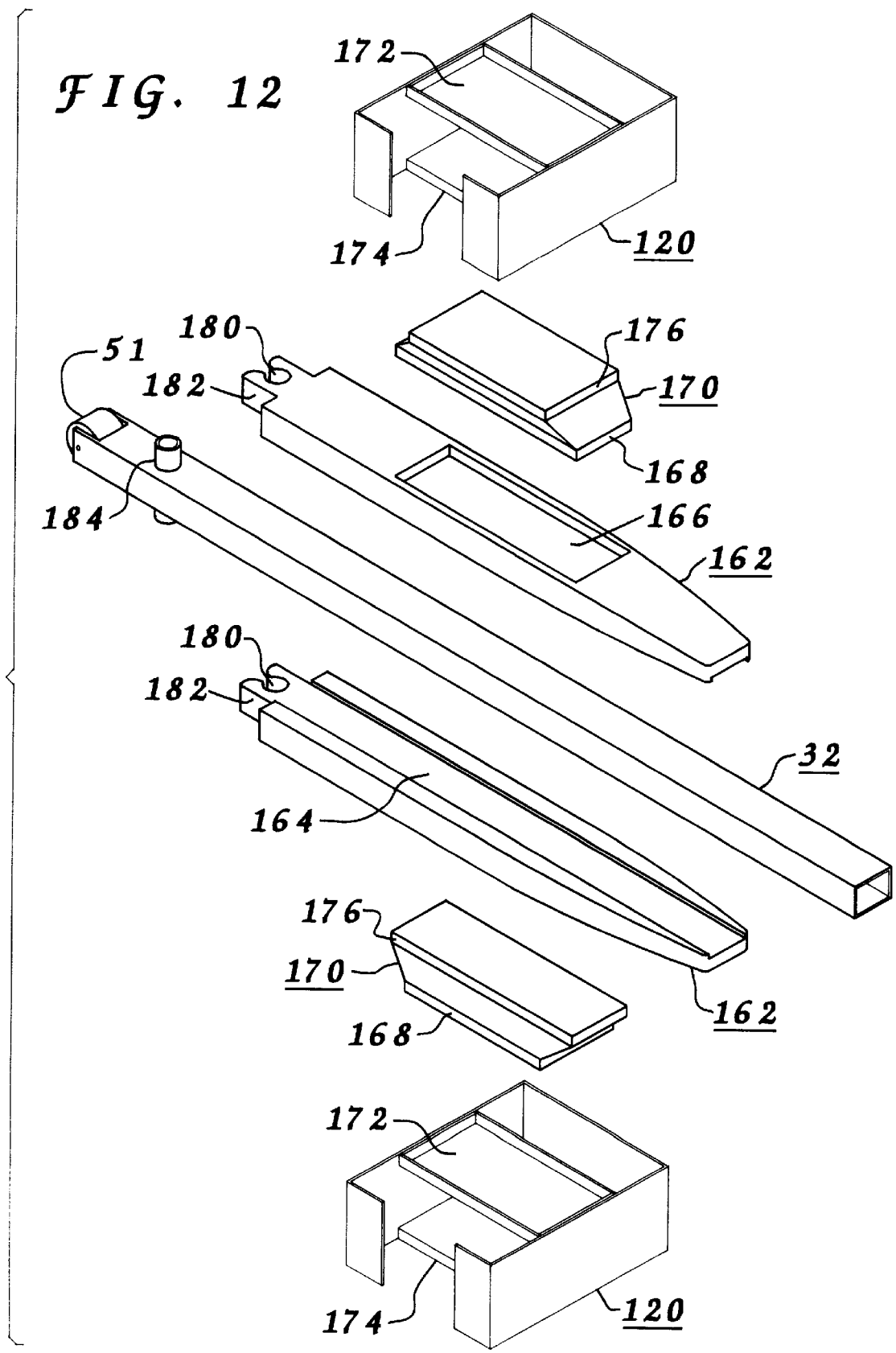

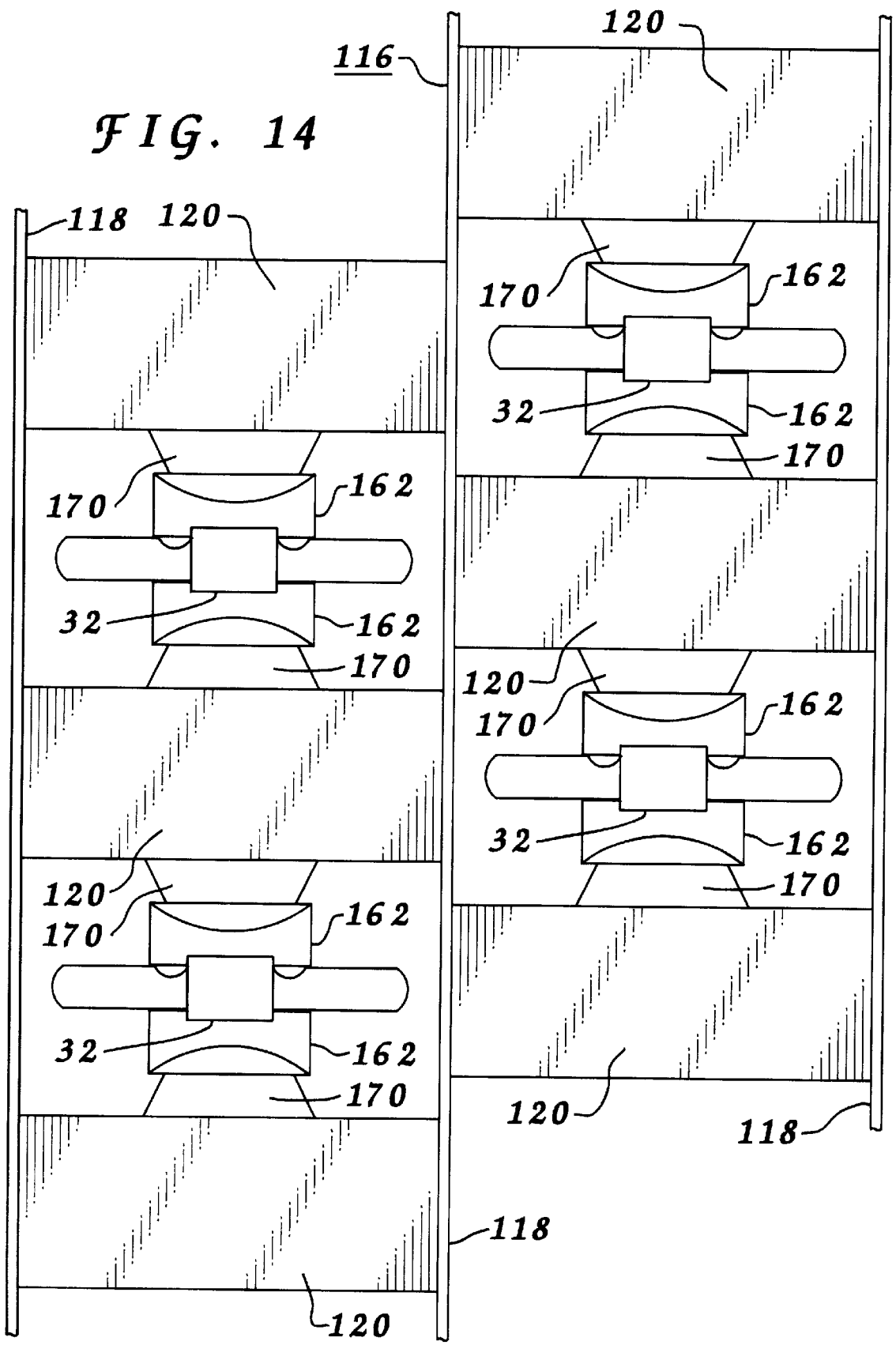

FIG. 16
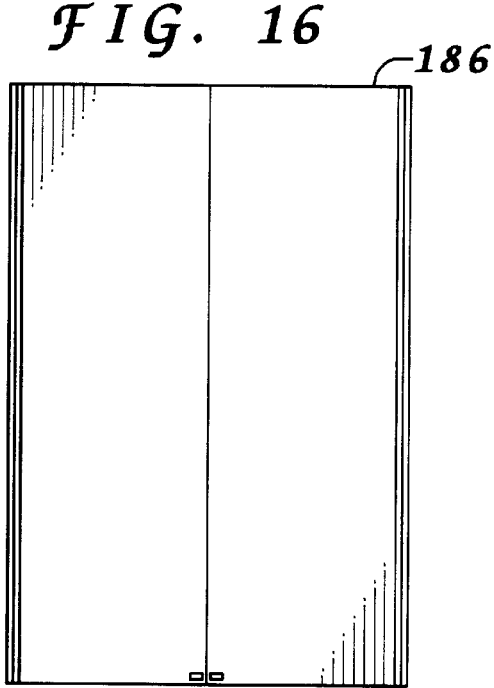
FIG. 17
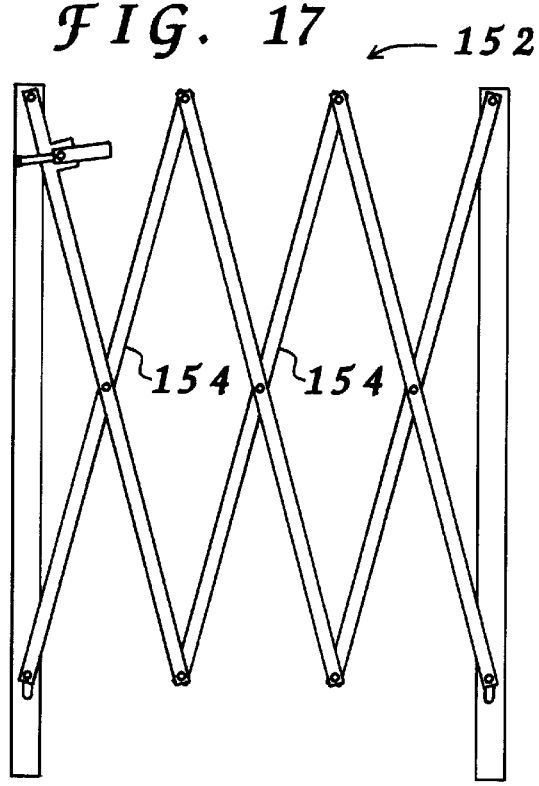
FIG. 18a  FIG. 18b  FIG. 18c
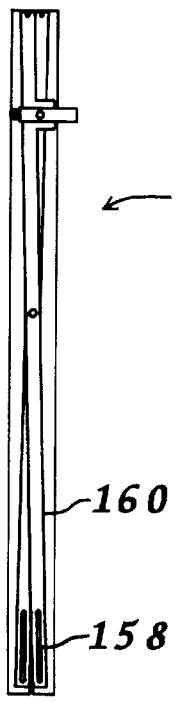 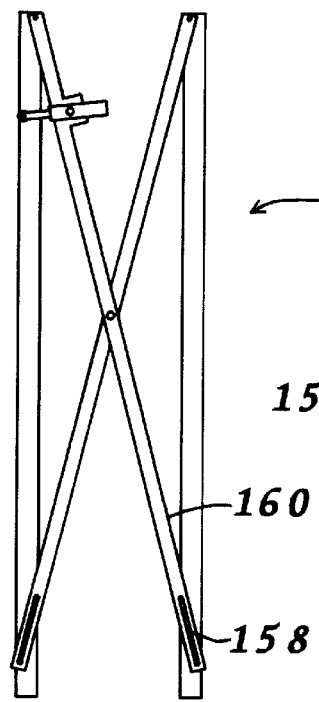 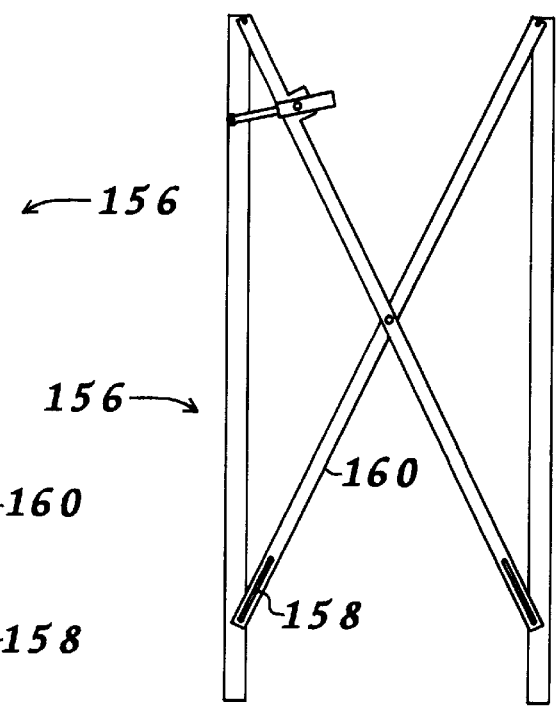

FIG. 19a FIG. 19b FIG. 19c FIG. 19d FIG. 19e FIG. 19f FIG. 19g FIG. 19h

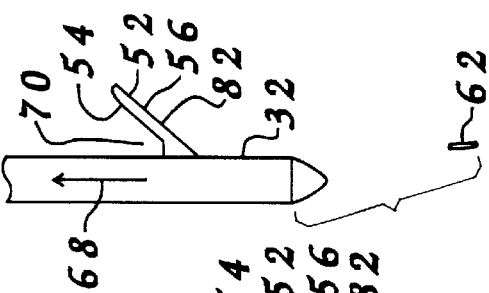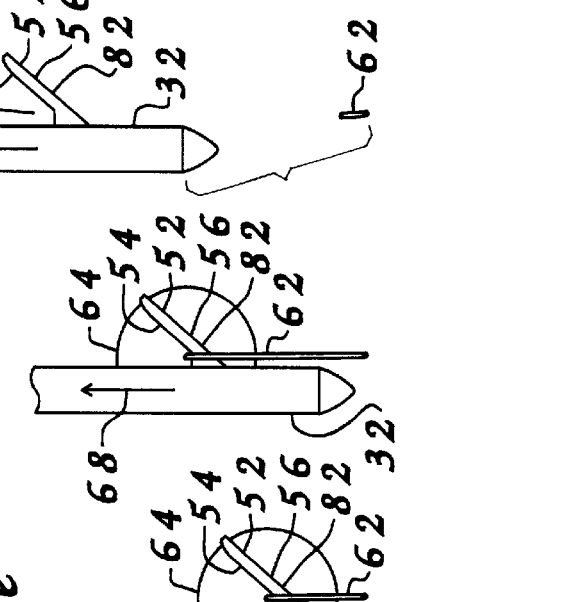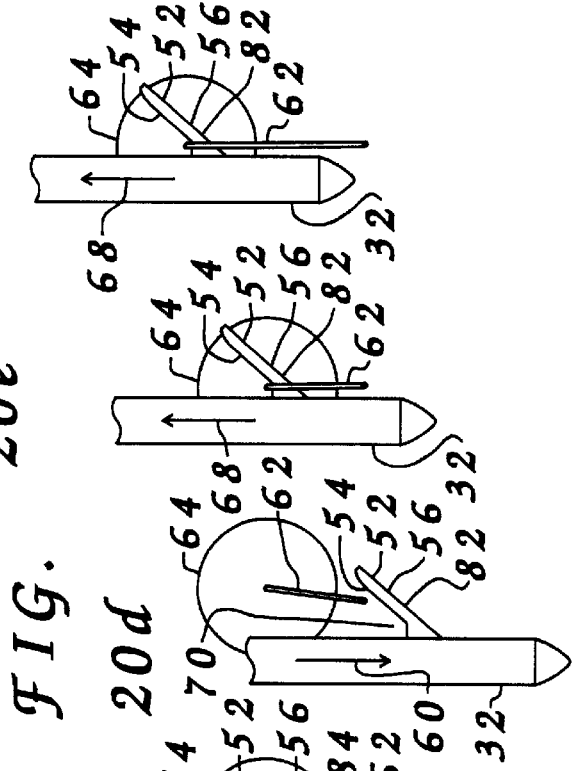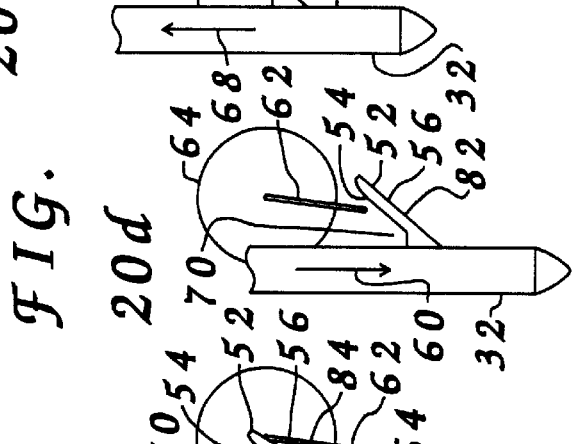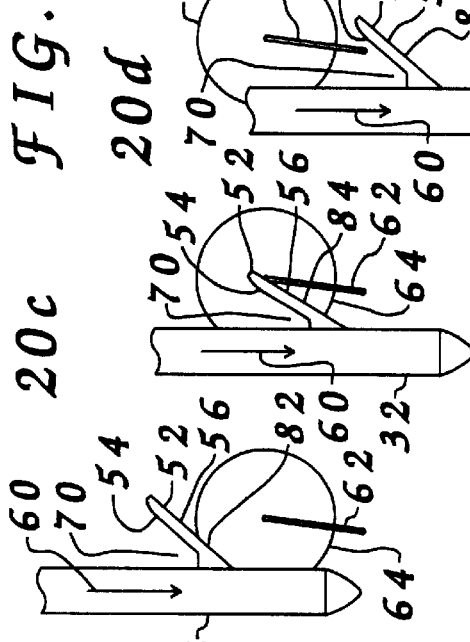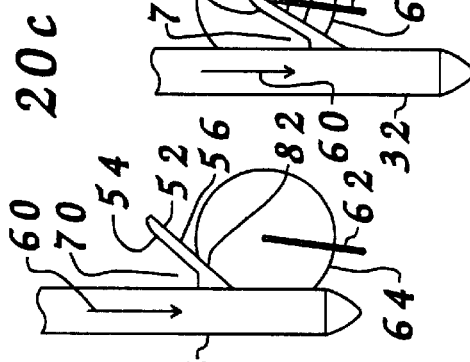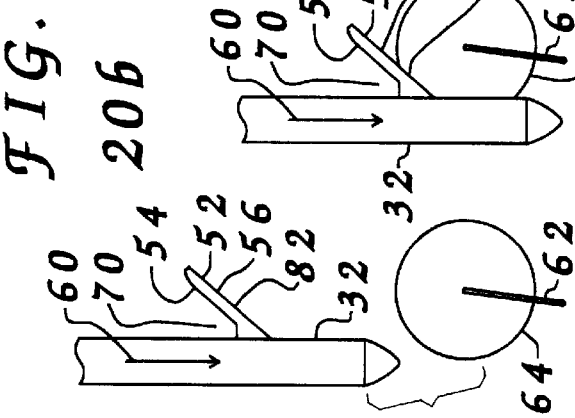

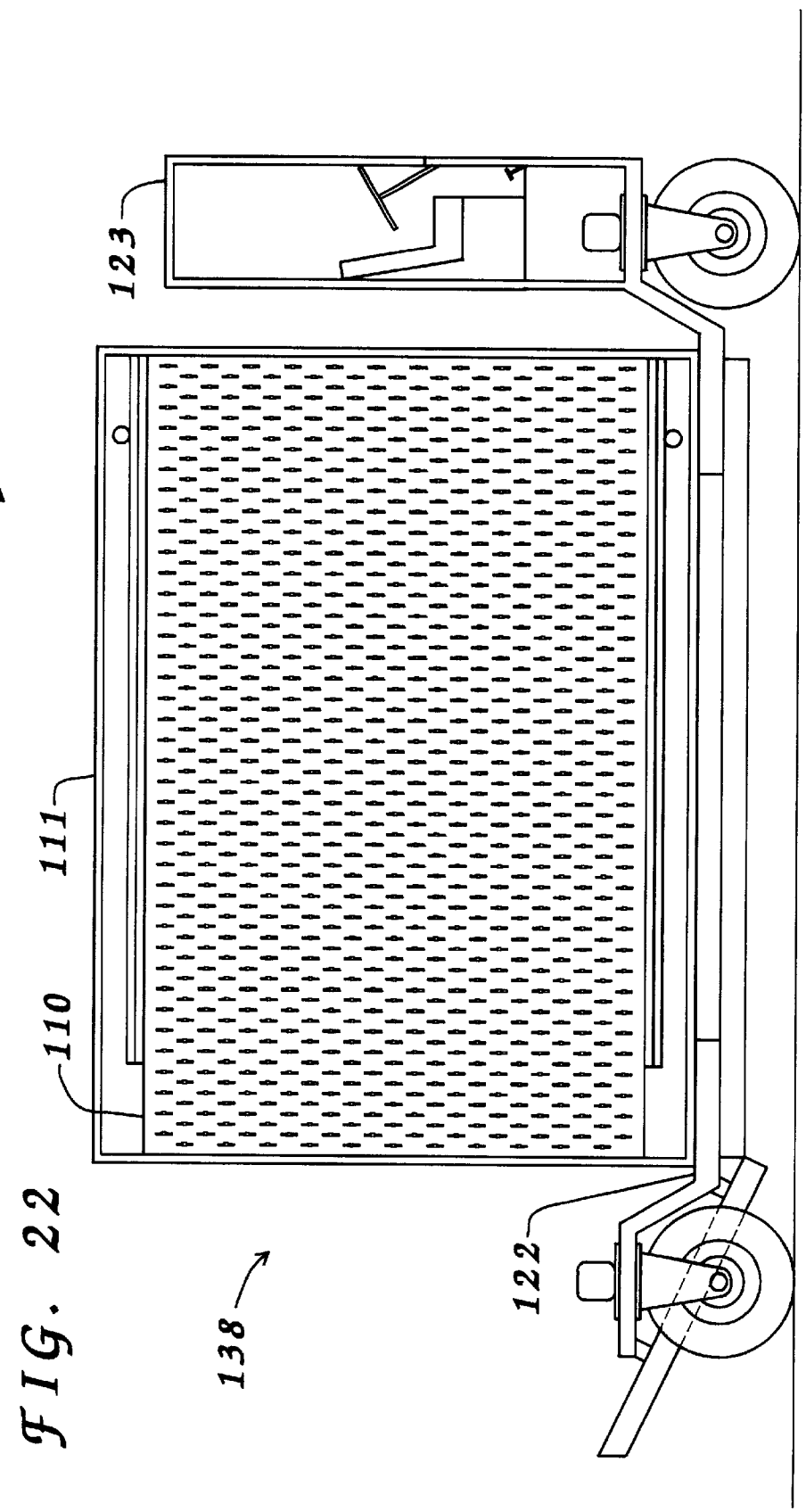

FRUIT HARVESTING MACHINE

BACKGROUND

1. Field of the Invention

Generally, the invention relates to fruit harvesting machines. More specifically, the invention relates to such machines which deploy a plurality of arms, with at least one picking finger extending from each arm, repetitively into and out of the canopy of a fruit tree to facilitate harvesting of the fruit from the fruit tree.

2. Description of the Prior Art

Numerous methods exist to harvest the various fruits currently being cultivated. A first group of such methods employ various mechanical devices which provide for a completely mechanical severing of the individual fruit from the parent tree. A second group of such methods employ various mechanical devices which provide assistance to individual human pickers during a picking procedure to sever the fruit from the parent tree. This group generally is limited to mechanical devices which may be held by the human picker during the picking procedure. A third method, specific to the type of fruit being harvested, involves the physical picking of the fruit from the parent tree by individual human pickers without utilization of any mechanical device.

Referring now specifically to citrus fruits, currently the vast majority of such fruit is harvested by being hand picked by people. This harvesting technique has changed little over the years. Pickers grasp individual citrus fruit members and exert a twisting action, a pulling action or a combination of a twisting and pulling action thereon to separate the fruit from the parent tree. Then, the picker places the severed fruit in a collection bag. This process is repeated until the collection bag has a desired quantity of picked fruit therein. At this point the contents of the collection bag are deposited into a secondary collection container of sufficient dimensions to contain a larger quantity of the picked fruit than that contained by the collection bag. While certain fruit on a tree is accessible while the picker stands on the ground, certain fruit on the tree may only be accessed by elevating the picker above ground level. The most common method of providing such elevation of the picker is by placing a ladder against the tree while the picker ascends the ladder. It is common practice in the industry to apply various chemicals to the tree and/or surrounding ground at various times prior to harvesting the crop. Therefore, chemicals may remain on the tree during the harvesting operation. As can be readily seen, the current method of manual harvesting of citrus fruit is time consuming and exposes the picker to dangerous conditions, including those during the period of time while the picker is elevated above ground level as well as possible exposure to chemicals.

Certain types of fruit are more adapted to such mechanical harvesting than other types of fruit. Reference is now made to machines which harvest fruit under the above identified method where there exists a completely mechanical severing of the fruit from the parent tree. The art is rich with such machines designed to harvest fruit by severing the fruit from fruit trees. Such machines generally employ one of two severing methods. The first method involves producing a shaking action within the canopy of the tree. This shaking action may involve grasping a portion of the tree and generating the desired shaking action on the entire tree or may involve insertion of one or more members into the canopy wherein the member or members produce the desired shaking action to the canopy without statically engaging, or otherwise grasping, a portion of the tree. The second method involves engaging individual fruit members, or engaging individual connecting stems, and producing a severing action between the individual fruit and the parent tree.

Without regard to the severing method employed, there exist three strong desires which need to be fulfilled in order for the specific harvesting machine to be commercially accepted within the industry. The first desire is to avoid any and all unnecessary damage to the parent tree during the harvesting of the fruit attached thereon. This desire relates to actual damage to the parent tree as well as incidental damage as exampled by removal of immature, or second crop, fruit from certain fruit trees which begin to produce the second crop prior to harvesting of a first mature crop. The second desire is to harvest an extremely high percentage of the mature fruit from each of the parent trees. The third desire is that the harvesting performed, which satisfies the above two desires, must be economically competitive compared to existing harvesting techniques.

Various deficiencies exist with machines which rely upon the shaking action principle. These machines universally have a tendency to damage the tree during harvesting therewith while leaving an unacceptable quantity of fruit on the tree. Additionally, it is commonly accepted within the industry that in order to render the fruit releasable from the tree at an acceptable lever of agitation, at least in the case of citrus fruit, that a chemical must be first applied to the tree and allowed to act over a period of days or even weeks.

Various deficiencies exist with machines which rely upon the severing action principle. These machines also universally have a tendency to damage the tree during harvesting therewith while leaving an unacceptable quantity of fruit on the tree.

Various attempts have been made to provide a machine capable of harvesting extremely high percentages of fruit from a parent tree while minimizing damage to the parent tree. These attempts have been less efficient than desired. As such, it may be appreciated that there continues to be a need for a mechanical harvesting machine which will harvest a high percentage of the fruit from the parent tree while inflicting minimal damage to the parent tree. The present invention substantially fulfills these needs.

SUMMARY

In view of the foregoing disadvantages inherent in the known types of harvesting machines, your applicant has devised a method of harvesting fruit from a parent tree wherein, in an economically competitive manner, high percentages of the fruit may be removed from the parent tree with minimal damage to the parent tree. A harvesting machine having features of the instant invention include a transport assembly, transport means to move the transport assembly through a fruit grove, a plurality of picking fingers to provide for an engagement of fruit during movement of the picking finger to produce a picking pressure during subsequent movement of the picking finger, a plurality of arms each having at least one of the picking fingers extending therefrom, an arm housing member containing an array of the plurality of arms and mounted on the transport assembly, displacement means to provide for a displacement of the arm housing member relative to the transport assembly alternatingly between a retracted orientation and an extended orientation and during an extension period and a withdrawal period and insertion yield means to provide for at least a partial yielding during the extension period for any select impacted arm which impacts an obstruction.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a fruit harvesting machine capable of harvesting fruit from a parent tree without damaging the parent tree.

Other objects include;

a) to provide for a fruit harvesting machine capable of harvesting a high percentage of the fruit on a parent tree.

b) to provide for a fruit harvesting machine capable of economical operation during a harvesting procedure.

c) to provide for picking fingers angularly extending from arms wherein the picking fingers may be selectively displaceable relative to the arm in response to various directional pressures applied thereon.

d) to provide for picking fingers having a release point whereat the majority of resistance pressure is released, the picking finger is displaced, and any object contained within the angular intersection of the picking finger and the arm is released therefrom.

e) to provide for an arm housing member which houses a multiplicity of arms in a contained manner wherein the arms having a like directional orientation.

f) to provide for displacement of the arm housing member relative to a canopy of the fruit tree being harvested.

g) to provide for each arm to be flexibly mounted within the arm housing member to allow a deflection yielding of any select impacted arm, which impacts an obstruction, to avoid damage to the tree and to the harvesting machine.

h) to provide for each arm to be releasable from the arm housing member in response to impaction with an impacted obstruction to avoid damage to the tree and to the harvesting machine.

i) to provide for a mounting of the arms within the arm housing member wherein select components, including the arm with attached picking fingers as well as the mounting components, may be easily removed and replaced in the field without requiring the use of tools.

j) to provide for the mounting of the arms to be fulfilled using opposing recesses mounted on the arm housing member, opposing resilient blocks to be retained at a first end respectively within the recesses, opposing guides having recesses therein to respectively receive a second end of the resilient blocks and opposing tracks within the opposing guides to cooperate to receive the arm therein.

k) to provide for a passage of the picking fingers extending from each arm beyond the mounting guide during release of the arm from a deployed position relative to the arm housing member.

l) to provide for picking fingers to extend from opposing lateral sides of each arm to provide for the greatest possible picking coverage of the canopy of the tree during the harvesting procedure.

m) to provide for an elevational staggering of adjacent rows of arms within the arm housing member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 7 is an overhead plan view of an arm with picking fingers extending therefrom.

FIG. 8 is an overhead plan view of an arm cap.

FIG. 9a is an elevational front view of a picking finger.

FIG. 9b is an overhead plan view of the picking finger depicted in FIG. 9a.

FIG. 9c is an elevational rear view of the picking finger depicted in FIG. 9a.

FIG. 9d is a bottom plan view of the picking finger depicted in FIG. 9a.

FIG. 10 is an elevational front view of the arm and one picking finger.

FIG. 11a is a sectional view as taken from the section line 11a shown in FIG. 10.

FIG. 11b is a sectional view of the assembly depicted in FIG. 11a in an alternative orientation.

FIG. 11c is a sectional view of the assembly depicted in FIG. 11a in another alternative orientation.

FIG. 11d is a sectional view of the assembly depicted in FIG. 11a in yet another alternative orientation.

FIG. 12 is an exploded perspective view of an arm mounting assembly.

FIG. 14 is an elevational front view of four (4) deployed arm assemblies.

FIG. 16 is an elevational rear view of a reseating assembly.

FIG. 17 is an elevational side view of an extension assembly.

FIG. 18a through FIG. 18c are elevational side views of an extension assembly in alternative orientations.

Figures 19A, 19B, 19C, 19D, 19E, 19F, 19G, 19H:
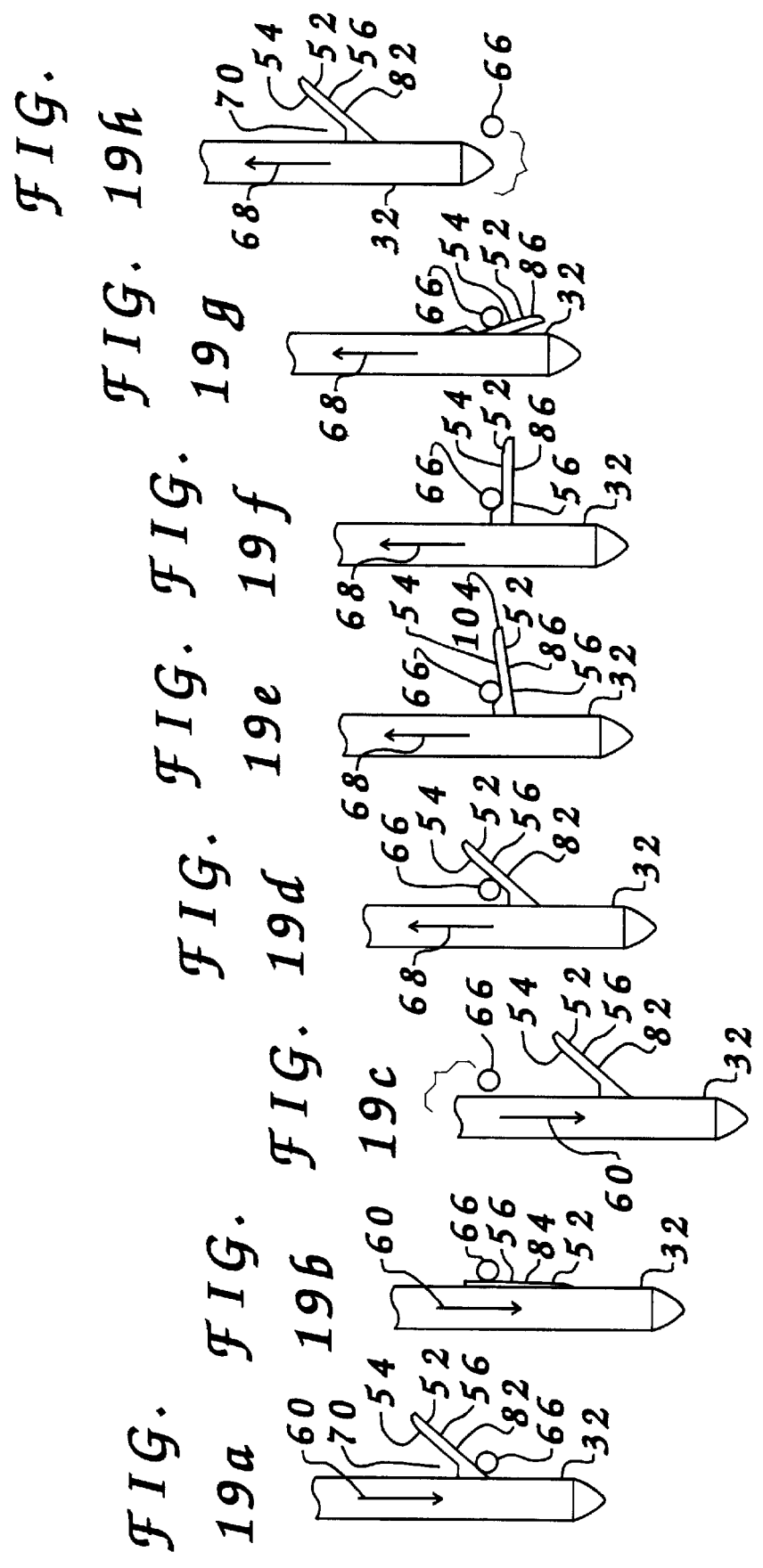

FIG. 19a through FIG.19h are overhead plan views of an arm and a picking finger in various operational orientations.

FIG. 20a through FIG. 20g are overhead plan views of the arm and picking finger depicted in FIG. 19a in various operational orientations.

FIG. 22 is an elevational side view of the harvesting machine depicted in FIG. 5 while in a transport configuration.

DESCRIPTION

Figure 1:
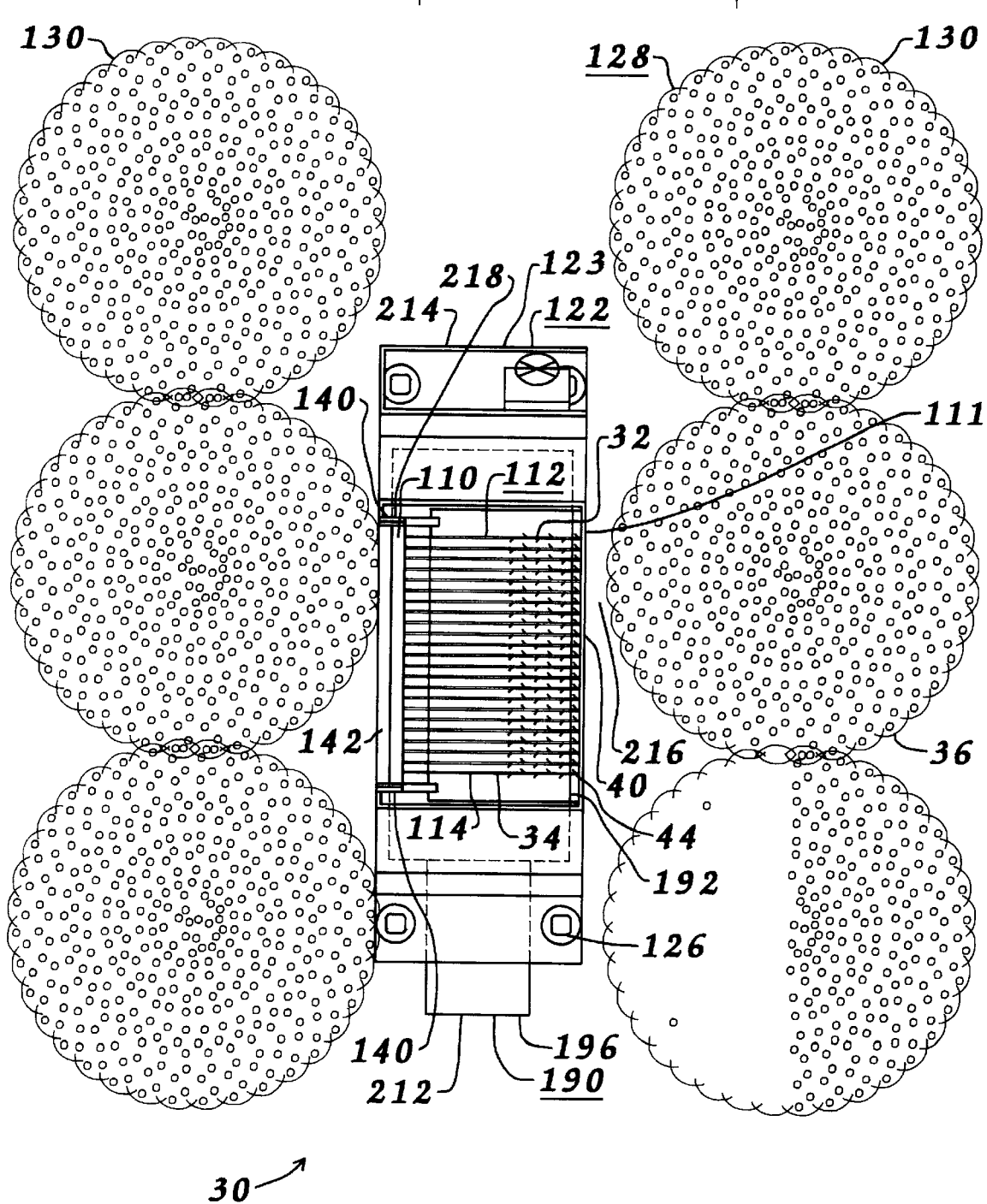
FIG. 1 is an overhead plan view of a harvesting machine in a first operational orientation.

Reference is now made to the drawings where like reference numerals refer to like parts throughout the various views. A harvesting machine 30, or portions thereof, which has the function of harvesting fruit from fruit trees, wherein the fruit trees are distributed in aligned rows, is depicted in various views.

Arms

Figure 2:
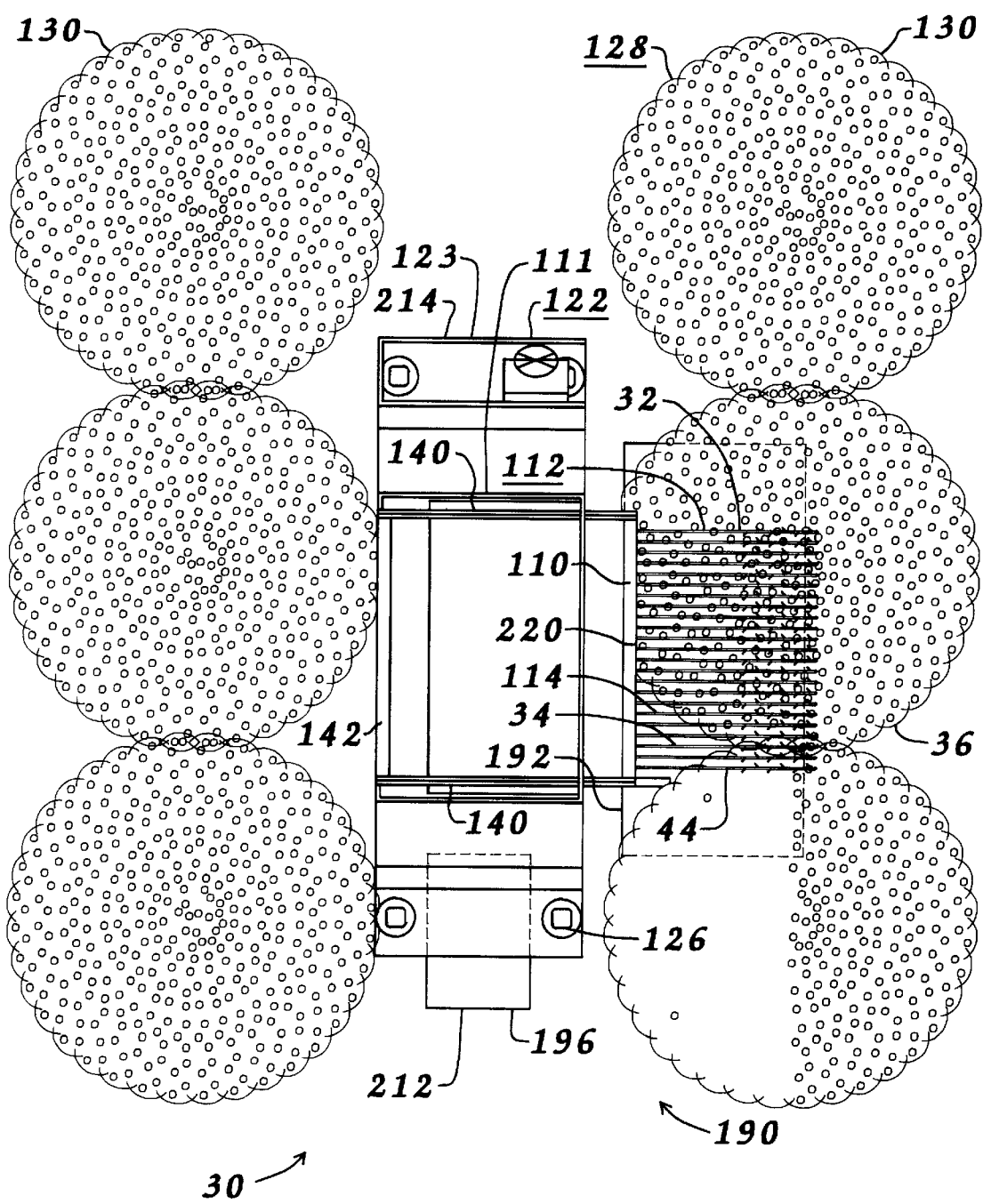
FIG. 2 is an overhead plan view of the harvesting machine in a second operational orientation.

It is a requirement, during harvesting using a harvesting machine having features of the instant invention, that a plurality of arms be inserted into and withdrawn from the canopy of the parent tree of the fruit being harvested. It is preferred that these arms be linear, or straight. It is a strong desire that the design of the individual arms allow for penetration of the canopy with minimal resistance to such penetration. It is also a requirement that picking fingers, described elsewhere herein, be mounted to extend from the arm. It is also preferred that each picking finger be displaceable relative to the arm. Therefore, it is preferred that components which allow the desired displacement be housed, at least partially, within the confines of the arm. While recesses may be installed in a solid arm to house these components, preferably, the arm will be of a hollow design to allow for easy installation therein of the components. An arm 32, see FIG. 7, has a longitudinal length 34 of sufficient length to permit adequate penetration of a tree 36, see FIG. 1 and FIG. 2. Arm 32 may be formed of various materials and may have any desired cross sectional shape. Arm 32 is depicted as formed of a tube 38. Arm 32 has a distal end 40 and a coupling end 42. During normal operation, coupling end 42 is attached to structures, described elsewhere herein, to retain arm 32 in a deployed position 44, shown in FIG. 1, FIG. 2, FIG. 13a and FIG. 15.

Arm 32 preferably has a taper 46 at distal end 40 to assist in penetration of tree 36. FIG. 7 and FIG. 8 depict an arm cap 48 having taper 46 incorporated thereon. Arm cap 48 also has a mounting end 50 suitable for insertion into tube 38 of arm 32. Arm cap 48 may be secured to arm 32 by any of the methods conventionally known in the art. Arm 32 has a roller 51 attached at the terminal end of coupling end 42. Roller 51 is more fully disclosed elsewhere herein.

Picking Fingers

It is a requirement, during harvesting using a fruit harvesting machine having features of the instant invention, that the parent tree be slidably engaged proximate a select fruit in order to subsequently produce a picking pressure between the select fruit and the parent tree. At least one picking finger, and preferably a plurality of picking fingers, will extend from each deployed arm.

Various configurations of picking fingers may be employed. Each picking finger will have an outer surface and an inner surface relative to the arm. It is a requirement that a portion of both the outer surface and the inner surface of each picking finger be angularly arranged relative to the respective arm while in the deployed position. The angular arrangement of the outer surface will provide for insertion of the arm into the canopy of the parent tree with minimal resistance. The angular arrangement of the inner surface will provide for a sliding engagement of branches of the parent tree during withdrawal of the arm from the canopy while providing for engagement of fruit attached to those branches where that fruit has a diameter equal to, or greater than, a predetermined measurement.

FIG. 9a through FIG. 9d, FIG. 11a through FIG. 11d, FIG. 19a through FIG. 19h and FIG. 20a through FIG. 20g depict a picking finger 52 having the above identified properties. Picking finger 52 has an inner surface 54, best shown in FIG. 9c, an outer surface 56, best shown in FIG. 9a and an extension distal end 58. Preferably, inner surface 54 has a rounded contour in close proximity to extension distal end 58 to prevent rigid engagement of objects.

Outer surface 56 provides for contact with portions of the tree during an extension 60 of arm 32. These portions of the tree are exampled by a stem 62, which may have a fruit 64 attached thereto, and a branch 66. Due to the obtuse angular orientation of outer surface 56 relative to arm 32 objects tend to be displaced away from outer surface 56 in the absence of significant resistance. If such resistance is met by outer surface 56 of picking finger 52 during extension 60, see FIG. 19a and FIG. 19b, picking finger 52 may move relative to arm 32 to allow passage of the source of the resistance, branch 66 in this case.

Inner surface 54 provides for contact with portions, previously described, of the tree during a retraction 68 of arm 32. Due to the acute angular orientation of inner surface 54 relative to arm 32 objects are gathered into an intersection 70 therebetween. In the case of significant resistance, as exampled by branch 66, picking finger 52 may be displaced to release the object. In the case of stem 62, stem 62 will move to intersection 70 and proceed to slide along inner surface 54 and/or an upper surface 72, best shown in FIG. 9b, until clear of picking finger 52 or until fruit 64 attached thereto engages a lower surface 74, best shown in FIG. 9d. Fruit 64 then becomes trapped by picking finger 52 and arm 32 during continued retraction 68 of arm 32. During retraction 68 pressure increases between fruit 64 and stem 62 until fruit 64 is severed from the tree or until picking finger 52 is displaced and fruit 64 is released.

Preferably, lower surface 74 has a series of indentations 76, best shown in FIG. 9a, FIG. 9c and FIG. 9d, thereon to enhance gripping properties between picking finger 52 and fruit 64. Preferably, upper surface 72 has a trench 78, best shown in FIG. 9a, FIG. 9b, FIG. 9c and FIG. 10, to further contain stem 62 of the tree. A cutting edge 80 is formed by the intersection of trench 78 on upper surface 72 and outer surface 56. Cutting edge 80 may, in certain situations, provide a cutting pressure to stem 62 during retraction 68. During extension 60 the predominate surface of picking finger 52 to make contact with objects of the tree is outer surface 56. During retraction 68 the predominate surface of picking finger 52 to make contact with objects of the tree is inner surface 54.

Picking Finger Mounting

Preferably, the picking fingers will be capable of various displacement relative to the arm during a harvesting operation. During insertion of the picking finger into the parent tree the picking finger should be capable of displacement against the arm in response to minimal resistance of an obstruction against the outer surface of the picking finger. This displacement action results in a minimal disturbance of the canopy, and therefore significantly reduces the likelihood of damage thereto, during insertion. During withdrawal of the picking finger from the parent tree the inner surface of the picking finger will be slidably engaging the branches of the canopy. The picking finger should be capable of displacement relative to the arm to release any branches contained therein in response to reaching a predetermined threshold of pressure. This threshold of pressure will be established to be greater than that level required to facilitate separation of the fruit from the parent tree. This displacement action significantly reduces the likelihood of damage to the parent tree.

Preferably, the releasing displacement of the picking finger, during the withdrawal operation, will have a release point at which resistance to further displacement significantly diminishes. This release point preferably is positioned such that when the inner surface of the picking finger is substantially perpendicular to the arm release occurs. This release point acts to further reduce any likelihood of damage to the parent tree by eliminating any requirement of continued pressure by the obstruction against the inner surface. The release point also acts to eliminate the requirement that the obstruction slide along the inner surface during release. Such sliding release has the tendency to inflict damage to the obstruction. Sufficient redeployment pressure, while significantly diminished compared to the original release pressure, will exist to ensure that the picking finger is rapidly redeployed following release of the contributing obstruction. This action will ensure that each picking finger enjoys a high level of opportunity to facilitate separation of fruit from the parent tree during the withdrawal operation even following prior release of an obstruction.

Each picking finger will have an extension portion which angularly extends from the arm. Preferably, the components which regulate motion of the picking finger relative to the arm are housed within the arm where the arm is of a hollow tubular design. This configuration protects such components from damage or foiling due to contact with outside influences including those within the tree. It is possible, although not desirable, to have the components housed outside of the arm.

When the regulatory components are housed within the arm, it is possible to provide attachment directly to the structure of the arm. Alternatively, it is possible to provide a housing which contains the regulatory components and which has the extension portion protruding therefrom. This housing then is installed in a recess formed within the arm. This arrangement provides for fast and efficient replacement of worn or damaged picking finger assemblies with a minimal amount of effort.

The regulator components of the preferred embodiment must have a pivot point for the picking finger, a resistance member, an anchoring of one end of the resistance member relative to the arm and a variable resistance anchor on the picking finger of the opposing end of the resistance member. Various designs having these features may be employed without departing from the spirit of the instant invention.

Preferably, picking finger 52 is capable of various displacement from a primary position 82, see FIG. 11a, relative to arm 32. These displacements include an insertion range of motion 84, see FIG. 11b for one positional placement within insertion range of motion 84, and a withdrawal range of motion 86, see FIG. 11c and FIG. 11d for two positional placements within withdrawal range of motion 86. Insertion range of motion 84 comprises a range of positions from primary position 82 through to inner surface 54 of picking finger 52 being in close orientation, if not actual contact, with arm 32, see FIG. 11b. Withdrawal range of motion 86 comprises a range of positions from primary position 82 through to outer surface 56 of picking finger 52 being in close orientation, if not actual contact, with arm 32, see FIG. 11d. It is desired to provide for various resistance properties depending upon the type of displacement and the position within the respective range of motion 84 and 86 from primary position 82.

Numerous components may be employed to provide for the desired range of motion 84 of picking finger 52 during insertion and the desired range of motion 86 of picking finger 52 during withdrawal, with the desired resistance properties within those ranges of motion 84 and 86 respectively, relative to arm 32.

Referring now specifically to FIG. 9a through FIG. 9d and FIG. 11a through FIG. 11d picking finger 52 is depicted having a pivot aperture 88 therethrough for installation therein of a pivot shaft 90. Pivot shaft 90 is rigidly secured to tube 38 of arm 32. All displacement of picking finger 52 relative to arm 32 occurs as a result of movement of picking finger 52 relative to pivot shaft 90. Picking finger 52 extends out of tube 38 through an opening 92. Picking finger 52 also has a transfer channel 94 extending therethrough with a transfer shaft 96 displaceably installed therein. Transfer shaft 96 may, depending upon the positional relationship of picking finger 52 to arm 32, move along transfer channel 94 and thereby alter the spacing of transfer shaft 96 relative to pivot shaft 90. A spring 98 has opposing ends with one end attached to a spring anchor 100 which is secured to tube 38 of arm 32. The opposing end of spring 98 is secured to transfer shaft 96 within transfer channel 94. Spring 98 is so configured as to provide for stationary positioning of picking finger 52 in primary position 82 in the absence of external pressure applied to picking finger 52.

Spring 98 provides slight resistance pressure during displacement of picking finger 52 along insertion range of motion 84. Spring 98 provides for return of picking finger 52 to primary position 82 when such resistance pressure is removed. Spring 98 provides significant resistance pressure during displacement of picking finger 52 along withdrawal range of motion 86 while transfer shaft 96 remains at a far extent 102 within transfer channel 94 relative to pivot shaft 90. Spring 98 provides for return of picking finger 52 to primary position 82 when such resistance pressure is removed. If picking finger 52 passes a tangent 104 within withdrawal range of motion 86 transfer shaft 96 moves within transfer channel 94 from far extent 102 to a near extent 106. Following such transfer of transfer shaft 96 to near extent 106 resistance to further displacement significantly reduces due to the closer orientation of transfer shaft 96 relative to pivot shaft 90. Preferably, transfer channel 94 has an angular change 107, see FIG. 9b and FIG. 9d, positioned in close proximity to far extent 102. Once transfer shaft 96 passes angular change 107, transfer shaft 96 is easily displaced to near extent 106. When transfer shaft 96 is at near extent 106 spring 98 continues to provide for return of picking finger 52 to primary position 82 when resistance pressure is removed. When picking finger 52 is returned to primary position 82, transfer shaft 96 returns to far extent 102.

A recessed surface 108 adjacent opening 92 provides for positioning of spring 98 relative to picking finger 52 and also provides for a closer orientation of picking finger 52 to arm 32 while at the outermost extreme of withdrawal range of motion 86.

Picking Finger Motion

As described elsewhere herein, it is preferred that the picking finger be capable of various motion, at varying degrees of resistance in response to various applied pressures, relative to the arm. The picking finger will have a deployed position having an acute angle relative to the arm toward the insertion range of motion and an obtuse angle relative to the arm toward the withdrawal range of motion.

Referring now specifically to FIG. 19a through FIG. 19h picking finger 52 is retained in primary position 82 in the absence of pressure to inner surface 54 or outer surface 56. A relatively lower level of pressure applied to outer surface 56, see FIG. 19b, results in movement of picking finger 52 into insertion range of motion 84. A significantly greater level of pressure applied to inner surface 54, see FIG. 19e, results in movement of picking finger 52 into withdrawal range of motion 86. If such level of pressure continues to be applied to inner surface 54 that picking finger 52 passes tangent 104, see FIG. 11c, a significantly lesser level of pressure is required to continue movement of picking finger 52 along withdrawal range of motion 86, see FIG. 19g, and release of branch 66 occurs without occasion for additional damage to be inflicted on branch 66.

Referring now specifically to FIG. 20a through FIG. 20g picking finger 52 is similarly retained in primary position 82. When a relatively low level of pressure is applied to outer surface 56 by stem 62, see FIG. 20c, movement into insertion range of motion 84 may occur. During retraction 68 of arm 32 stem 62 is engaged by inner surface 54 of picking finger 52. The level of resistance required to move picking finger 52 into the withdrawal range of motion 86 is of a higher level of pressure than that pressure required to sever fruit 64 from stem 62, see FIG. 20f and FIG. 20g.

Arm Housing Member

It is a requirement, during harvesting using a fruit harvesting machine having features of the instant invention, that the plurality of arms be contained so as to have an aligned orientation. Each arm will be held, while in a deployed position, in close proximity to the coupling end. While it is preferred that all arms be contained to extend outward uniformly, it is possible, and even preferred for certain type of fruit, to have the uppermost arms offset from the remainder of the arms. This is a particularly expedient method of deployment when the parent tree has significant height, such as exists for certain citrus trees. Preferably, the plurality of arms are contained in an ordered pattern in order to produce a uniform effect upon the harvesting operation. Alternatively, it is possible to provide an array having a denser coverage of arms at select locations within the array. One example of such an arrangement places a tighter spacing of the arms around the perimeter of the array.

The arm housing member is the element which is actually displaced during each harvesting cycle of extension and retraction. The arm housing member will have a retracted orientation, where the arms contained thereon are at their furthest retracted position, and an extended orientation, where the arms are at their furthest extended position. While it is common to move the arm housing member between these two positions during each cycle, it is possible to move the arm housing member between cycling positions which do not extend to these positions.

It is possible to provide for a vibration of the arm housing member, and therefore of the individual arms extending therefrom, during the extension period to provide each arm with a heightened ability to avoid impacting contact with elements, as exampled by branches, within the tree. This is easily accomplished by numerous methods conventionally known in the art. A particularly expedient method is to provide for mounting of the arm housing member relative to the structure which provides for displacement using yielding members as exampled by a dense compressible material such as rubber or heavy springs. A device to produce a cam action to oscillate the arm housing member relative to the displacement structure may then produce the desired vibration of the arms.

FIG. 1 through FIG. 6 depict an arm housing member 110 contained within an arm cage 111. Arm housing member 110 has a plurality of arms 32 contained thereon forming an array 112. Arms 32 are contained in a plurality of vertically oriented rows 114. Preferably, as depicted, each adjacent pair of rows 114 are positioned so as to provide for a vertical staggering of arm therebetween, see FIG. 5. This provides for the greatest possible coverage of the canopy during each picking cycle of extension and withdrawal.

FIG. 14 depicts four (4) arms 32 contained within a frame 116 formed by vertically oriented spaced plates 118. Each adjacent pair of plates 118 has a plurality of mount boxes 120, clearly depicted in FIG. 12, rigidly attached to the opposing plates 118. Therefore, arm housing member 110, in the absence of arms 32 installed therein, is formed of a rigid connection of plates 118 and mount boxes 120.

Transport Assembly

It is a requirement, during harvesting using a fruit harvesting machine having features of the instant invention, that the arm housing member with the deployed arms be moved adjacent the row of trees being harvested. Numerous configurations of transport assemblies, as conventional known in the art, may be used to transport the various assemblies required by the invention. Preferably, the transport assembly will be wheeled and so equipped as to permit navigation through the various rows of conventional groves.

FIG. 1 through FIG. 6 depict a transport assembly 122 having various features of the instant invention. Transport assembly 122 provides for mounting of the various components required to fulfill the function of mechanical harvesting of fruit. Transport assembly 122 has an operator cage 123 to protect an operator, not shown, during operation of harvesting machine 30.

Operational Transport

It is a requirement, during harvesting using a fruit harvesting machine having features of the instant invention, that the transport assembly, having the various assemblies required by the invention, be propelled to move between positions of deployment adjacent each select tree being harvested. In normal operation these positions are along a side of a row of trees. The transport assembly preferably is self propelled to provide for accurate placement by the operator. Alternatively, the transport assembly may be either towed or pushed by a transport vehicle.

When the transport assembly is self propelled, it is particularly expedient to provide for each of the wheels thereon to be powered to propel the assembly. This is easily accomplished using hydraulic drive units powering each wheel, as exampled by direct hydraulic drive or through an intermediate drive assembly as further exampled by a chain transfer. When all of the wheels are powered to propel the assembly, a further expedient arrangement is to provide each wheel with steering capabilities as exampled by hydraulic powered steering.

It is preferred that the harvesting machine be stopped during each of the harvesting cycles. This provides for a stationary support of the assembly to reduce incidental displacement of the arm while within the canopy of the tree. Alternatively, the transport assembly may constantly move along the row of trees while the arm housing member is displaced rearward along the transport assembly at a pace matching the pace of advance of the transport assembly during the extension and withdrawal cycles. Following completion of the withdrawal cycle, the arm housing member may be forwardly displaced along the transport assembly to the next position of harvesting.

Utilizing the preferred pause method, during each advance of the transport assembly for subsequent harvesting on a new location the operator may visually ascertain, and thereby judge, the location of the proper position to place the transport assembly. Alternatively, it is possible to provide a measuring device which will measure the advance and either automatically pause the transport assembly at the proper location or notify the operator of such arrival.

FIG. 1 through FIG. 6 depict transport assembly 122 wherein transport assembly 122 is self propelled. Transport assembly 122 is self contained and has a plurality of wheels 124 and hydraulic drives 126, as conventionally known in the art, providing power to each wheel 124. In this embodiment each wheel 124 has steering control which allows the operator to guide transport assembly 122 within a grove 128 having a plurality of adjacent rows 130. Arm cage 111 provides protection to arms 32 during motion of harvesting machine 30.

Figure 21:
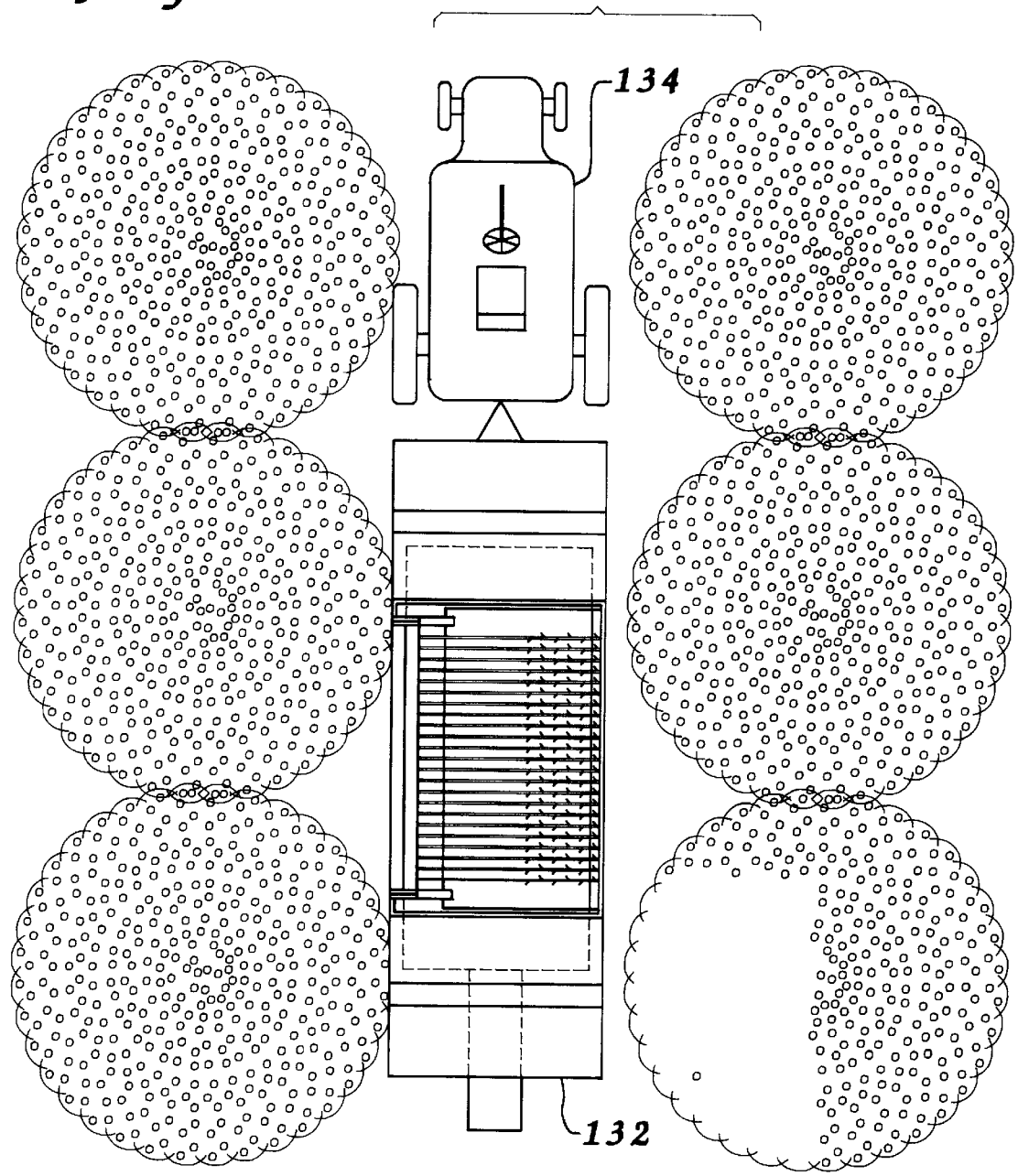
FIG. 21 is an overhead plan view of another embodiment of a harvesting machine.

FIG. 21 depicts a transport assembly 132 being towed by a tractor 134. In this embodiment transport assembly 132 does not need to be self propelled nor even self powered, being capable of receiving power from tractor 134 to power the various operations of the equipment installed on transport assembly 132.

Non-Operational Transport

It is a requirement that the harvesting machine be legally capable of transport along highways to deliver the harvesting machine to sites of operation. Numerous legal limitations exist for such transport with these limitations varying from state to state. One particularly important consideration is the overall travel height of the harvesting machine. It is preferred that the harvesting machine be of sufficient height to harvest fruit from the tallest trees possible, depending upon the particular fruit being harvested. Generally, this height renders the harvesting machine impractical for highway transport while in a harvesting configuration. Numerous methods exist to transfer equipment from a working configuration to a transport configuration and many of these methods may be employed with harvesting machines based upon the instant invention.

A particularly expedient method is to provide for rotational displacement, utilizing devices installed therewith, of the arm housing member, with the arm installed therein, relative to the transport assembly. This arrangement allows for a fully self contained machine which does not rely upon other detached equipment to position components in the harvesting configuration.

Figure 5:
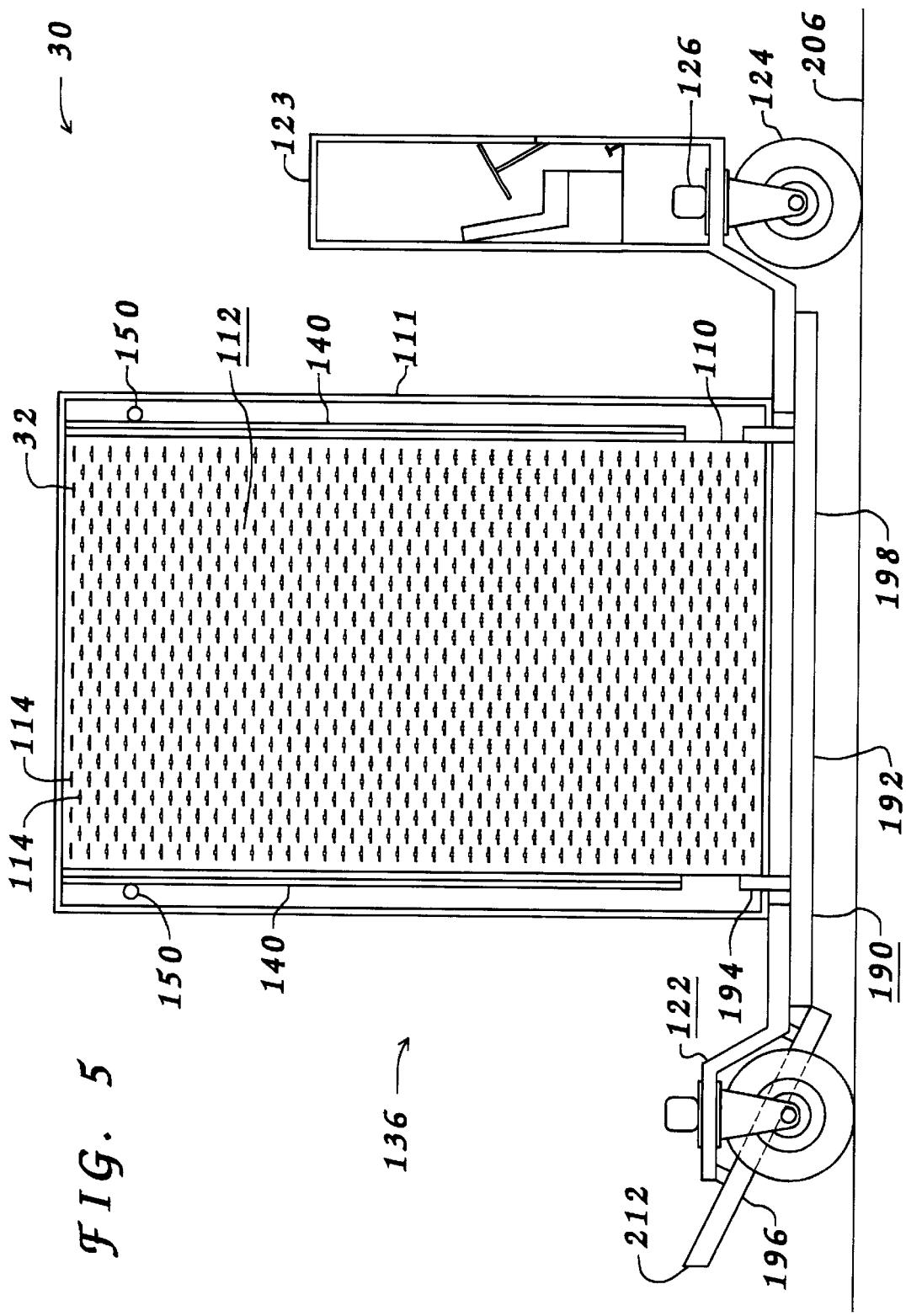
FIG. 5 is an elevational side view of the harvesting machine in the first operational orientation.
Figure 6:
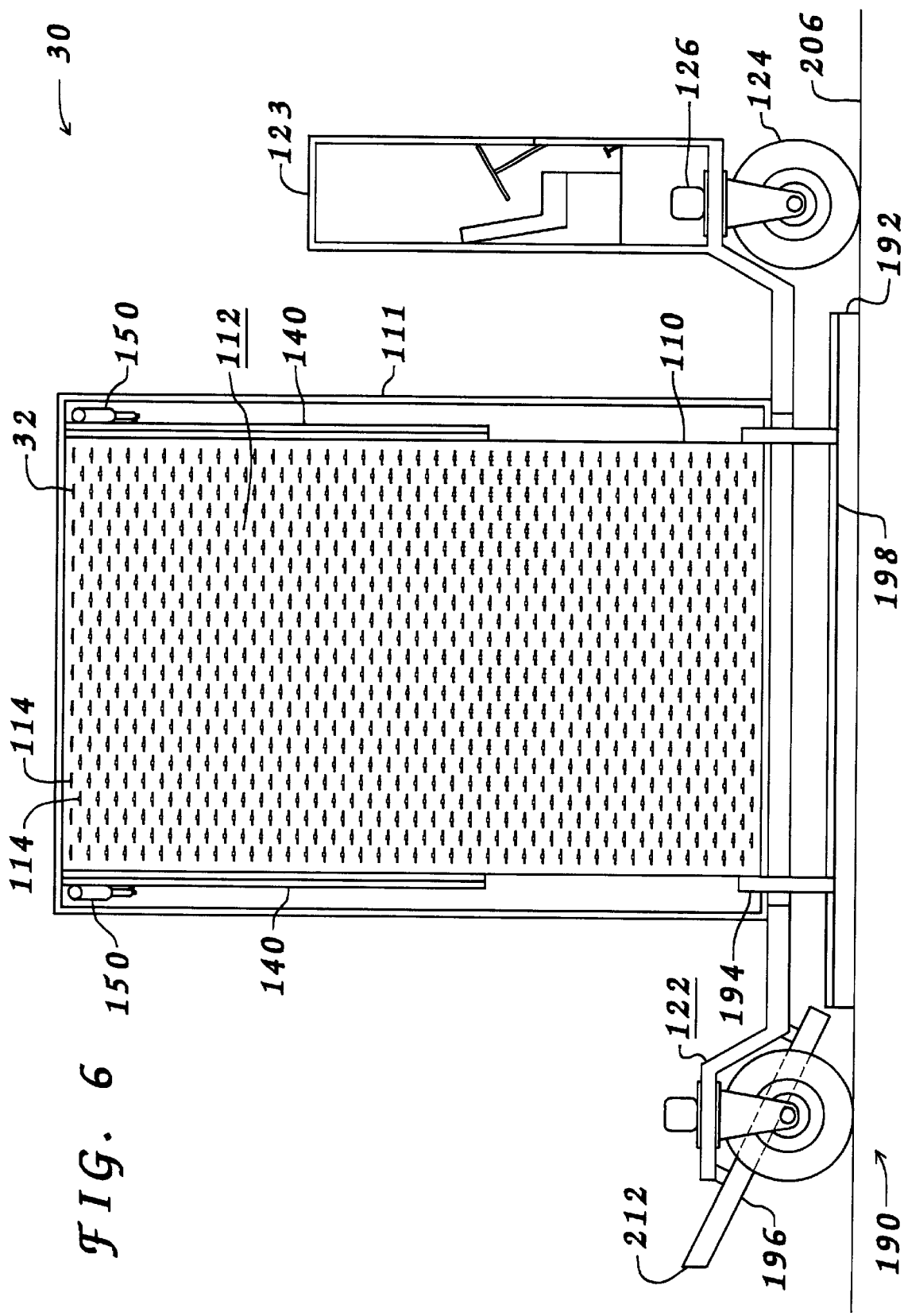
FIG. 6 is an elevational side view of the harvesting machine in the second operational orientation.

FIG. 5 depicts harvesting machine 30 in a harvesting configuration 136. While in this orientation harvesting machine 30 may be employed to harvest fruit from trees. FIG. 22 depicts harvesting machine 30 in a transport configuration 138 wherein arm housing member 110, contained within arm cage 111 which may protect arms 32, has been rotated ninety (90) degrees and lowered relative to transport assembly 122. While in this orientation harvesting machine 30 may be transported along highways between harvesting sites or between other sites. Operator cage 123 further protects the operator during the transfer operation between harvesting configuration 136 and transport configuration 138.

Displacement Means

It is a requirement, during harvesting using a fruit harvesting machine having features of the instant invention, that the arm housing member, having the array of arms extending therefrom, be extended toward the canopy of the tree being harvested and withdrawn away from the canopy. Any of the numerous methods conventionally known in the art may be employed to cause the cycle of extension and withdrawal.

A particularly expedient method of providing such displacement resides in having a pair of spaced scissor action supports connecting the arm housing member to the transport assembly. This type of displacement arrangement ensures that the arm housing member remains properly aligned with the transport assembly to ensure insertion and withdrawal along a generally common path. Numerous positional placements of the various connections exist. Further reinforcement of the structure, as conventionally known in the art, of the transport assembly, the arm housing member or both may be made as required by the structure being deployed.

A fruit catcher assembly, more particularly described elsewhere herein, may be linked to be displaced simultaneously with the displacement of the arm housing member. A particularly expedient method is to have the same displacement means provide for the cycle of extension and withdrawal of both the arm housing member and the fruit catcher assembly.

Due to the weight of the arm housing member and the deployed arms it is desirable to provide for a counterweight on the transport assembly to counteract any tendency of the assembly to tilt while the arm housing member is in the extended orientation. Ideally, such a counterweight would be displaced laterally across the transport assembly in a synchronized manner with the cycle of extension and withdrawal of the arm housing member. Numerous methods exist in the art to deploy such an arrangement. Ideally the transport assembly is balanced across its width when the arm housing member is at either of the respective extremes of extension or retraction.

Figure 3:
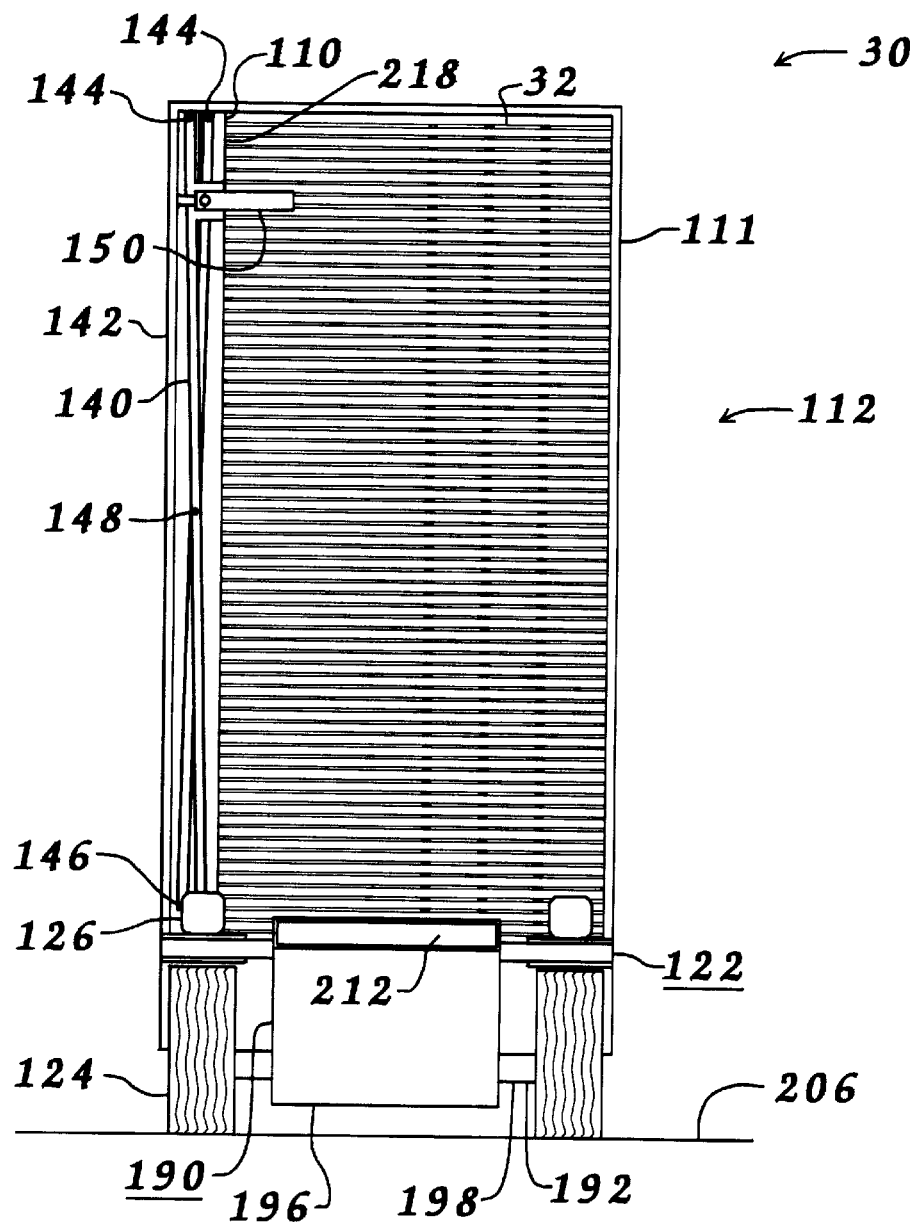
FIG. 3 is an elevational rear view of the harvesting machine in the first operational orientation.
Figure 4:
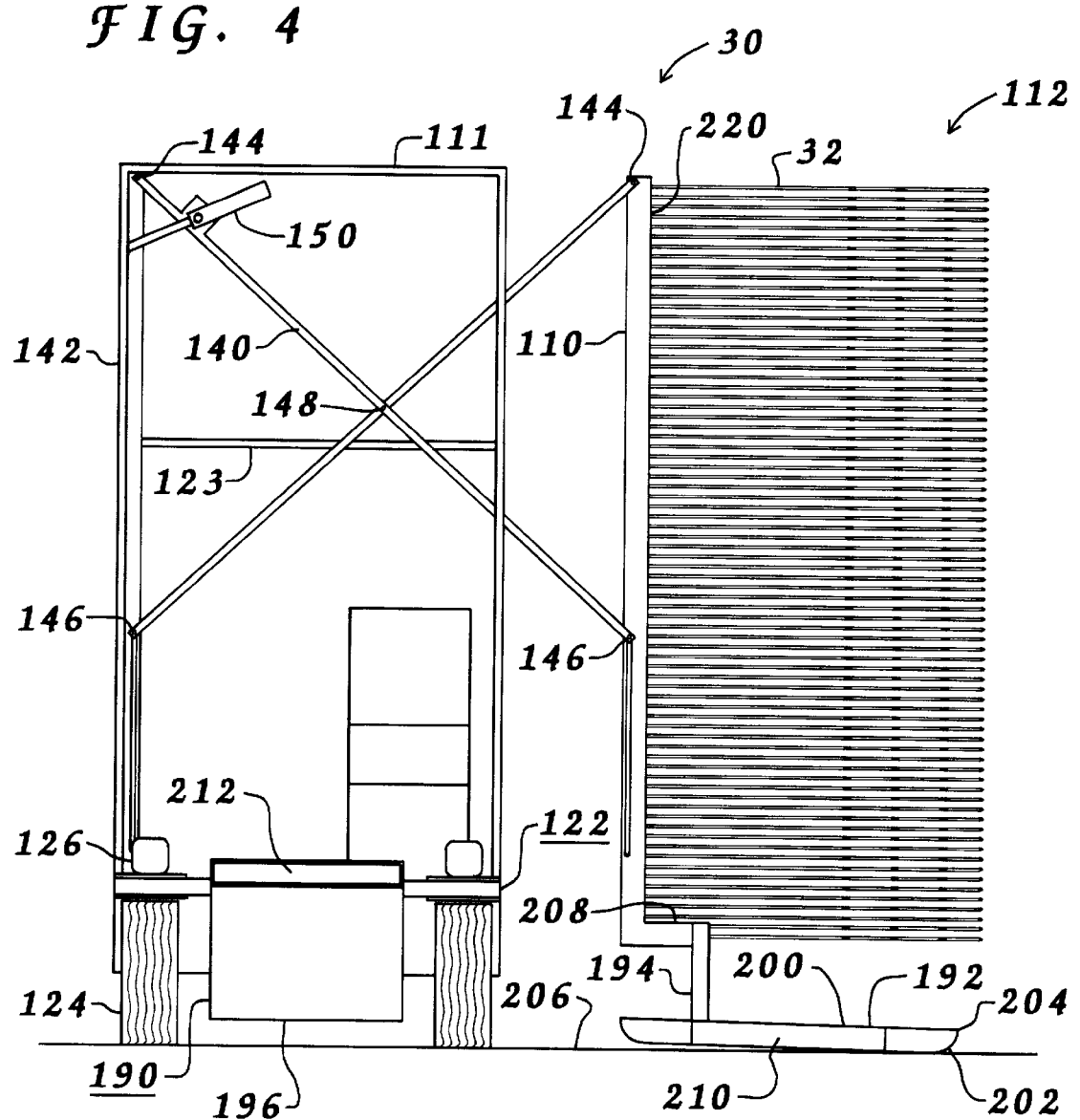
FIG. 4 is an elevational rear view of the harvesting machine in the second operational orientation.

FIG. 1 through FIG. 6 depict opposing scissor extension members 140, best shown in FIG. 3 and FIG. 4, which are mounted to arm housing member 110 and a support housing 142 which extends vertically from transport assembly 122. Each scissor extension member 140 has opposing pivotal connections 144 on support housing 142 and arm housing member 110 respectively. Each scissor extension member 140 also has opposing sliding connections 146 on support housing 142 and arm housing member 110 respectively. A central pivot connection 148 provides for cooperation between pivotal connections 144 and sliding connections 146 to retain arm housing member 110 in a proper alignment with support housing 142 during extension and retraction of arm housing member 110 relative to support housing 142. A hydraulic drive 150 provides for displacement of scissor extension member 140 relative to support housing 142.

FIG. 17 depicts an alternative embodiment of a scissor extension member 152 having a plurality of linking members 154 thereon. FIG. 18a through FIG. 18c depicts yet another alternative embodiment of a scissor extension member 156 having tracks 158 installed on linking members 160.

Deflection Yield Means

It is preferred, during harvesting using a fruit harvesting machine having features of the instant invention, that each arm be capable of at least slight deflection yielding when the normal path during displacement brings the arm into contact with a contacted obstruction. Such deflection yielding may take the simplest form of having a certain degree of flexibility in the arms. Alternatively, it is possible to provide for the attachment between the arm and the arm housing member to provide for a three hundred and sixty, (360), degree radial yielding of a desired rigidity. A block mounting, wherein the block is formed of a compressible material, is preferred to provide the deflection yielding. Alternatively, springs, of any suitable type conventionally known in the art, may be employed to provide such mounting. These include conventional springs as well as other materials which provide similar physical properties including elastic straps. Preferably, in order to provide for the insertion yield characteristics described above, the arm will be attached to a guide which in turn is flexibly attached to the arm housing member.

FIG. 12, FIG. 13a, FIG. 13b, FIG. 14 and FIG. 15 depict opposing guides 162 which slidably engage, utilizing guide tracks 164, arm 32. Each guide 162 has a recess 166 which receives a first mounting end 168 of a resilient block 170. Each mounting box 120 has an upper pan 172 and a lower pan 174 rigidly installed thereon which are identically dimensioned. Resilient block 170 has a second mounting end 176 which is received in a respective pan 172 or 174. As described elsewhere herein, each mount box 120 is rigidly installed in arm housing member 110. When the above described components are assembled, see FIG. 13a, arm 32 is retained within guide tracks 164 of opposing guides 162. Resilient blocks 170 provide for movement of arm 32 to any deflection position 178 about a three hundred and sixty, (360), degree range, see FIG. 15. It is possible to provide for a limit to the angle of offset from deployed position 44 by varying the density of the material forming resilient blocks 170.

Insertion Yield Means

It is a requirement, during harvesting using a fruit harvesting machine having features of the instant invention, that each arm, or group of arms, be capable of yielding in response to resistance during the extension period relative to the arm housing member. During the extension period an arm may meet an impacted obstruction such as a branch of the tree. When such an event occurs, continued insertion of the arm would be likely to cause damage to the tree or would be likely to cause damage to the harvesting machine. Therefore, the arm must be capable of yielding longitudinally relative to the arm housing member. This yielding may be such that there ceases to be any insertion force or insertion may be slowed or stopped in response to the impaction.

Numerous methods exist to releasably anchor a first member relative to a second member where the first member slidably engages the second member. Any of these conventionally known methods may be employed to provide for the insertion yield means.

Preferably, the arm is slidably contained within a guide which, in turn, is attached to the arm housing member. The arm will have a deployed position within the guide which is the standard position during the harvesting procedure. During contact with the impacted obstruction the arm is released from the deployed position and may slide within the guide. Preferably, following release the only resistance to movement of the arm within the guide is the friction contact between the arm and the guide. Alternatively, resistance to displacement within the guide may be provided as exampled by springs. In either case, some structure will exist to ensure that the released arm is returned to the deployed position following completion of the withdrawal cycle and prior to beginning a subsequent insertion cycle. A backing plate, or plates, positioned behind the arm housing member may provide for such redeployment of any and all arms released during the prior harvesting cycle due to resistance to insertion into the canopy.

FIG. 12, FIG. 13a, FIG. 13b and FIG. 15 depict various mounting components described elsewhere herein, which provide for a sliding engagement of arm 32. Each guide 162 has a coupling member 180 installed at a rearward extent 182. Arm 32 has a complimentary coupling member 184 which extends from opposing sides of arm 32. Complementary coupling member 184 attaches to the opposing coupling members 180 to retain arm 32 in deployed position 44, see FIG. 13a and FIG. 15. When a significant level of pressure is directed along arm 32 from distal end 40, see FIG. 7, complementary coupling member 184 disengages from opposing coupling members 180 and arm 32 is free to slide rearward within opposing guide tracks 164 of opposing guides 162.

Figure 15:
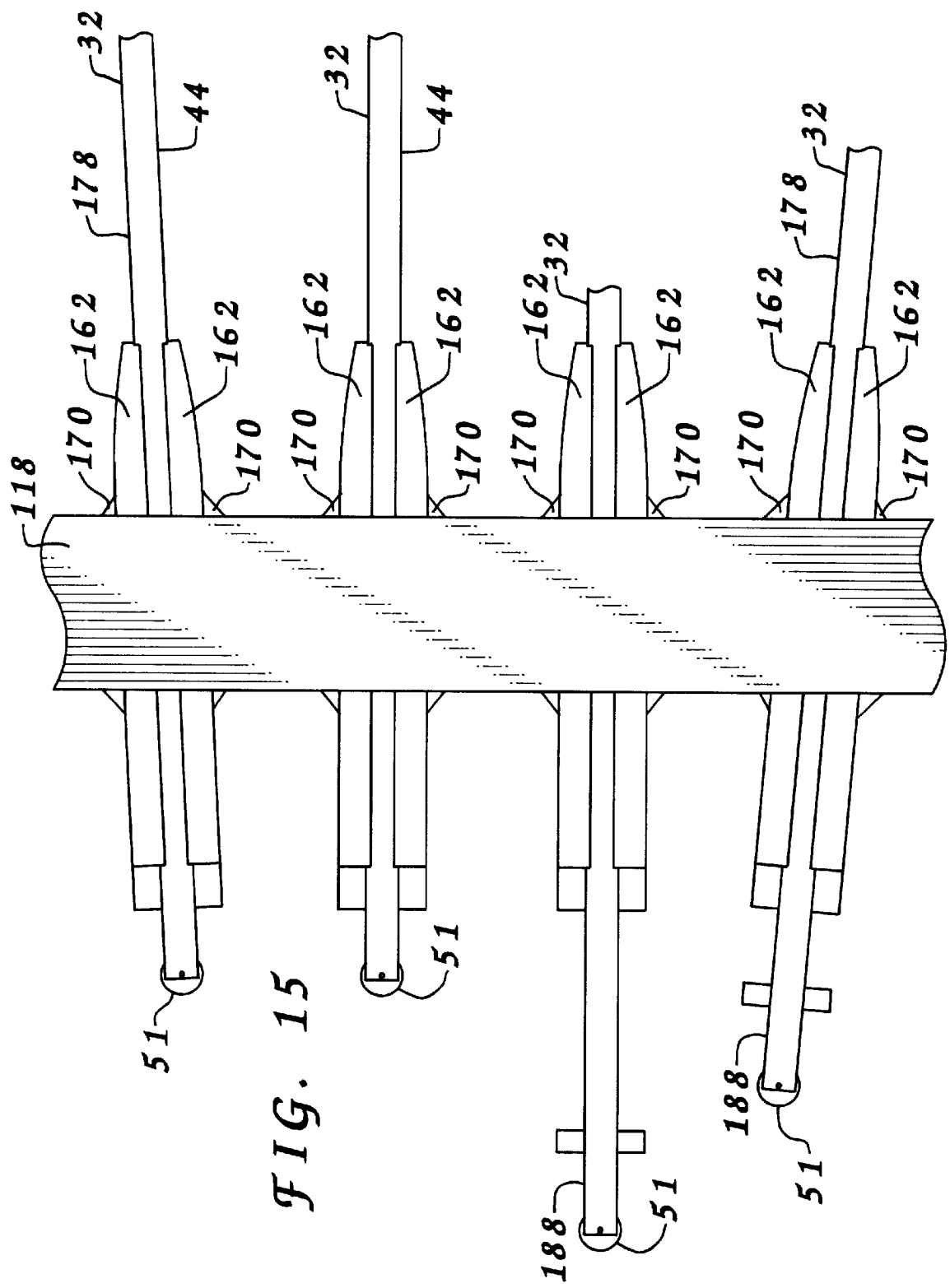
FIG. 15 is an elevational side view of four (4) deployed arm assemblies.

FIG. 16 depicts a reseating assembly 186 which may be mounted on support housing 142, see FIG. 1 through FIG. 6, to contact roller 51 of any released arms 188, see FIG. 15, at the completion of the withdrawal cycle to reposition released arms 188 into deployed position 44.

Component Replacement

It is preferred, during harvesting using a fruit harvesting machine having features of the instant invention, that certain components of the machine be readily replaceable in a simple operation. The arms must be easily replaceable in the field, in the advent of damage occurring to the arm proper or to any of the picking fingers or other components attached thereto. The components which provide for the insertion yield means must be easily replaceable in the field. The components which provide for the deflection yield means, if separate components are deployed beyond ensuring adequate flexibility of the arm, must be easily replaceable in the field.

A particularly expedient method is to provide for the mounting assembly to be retained relative to the arm housing member as a result of pressure created by positioning of the arm relative to the mounting assembly. This reduces the requirement for separate fasteners which would require additional manipulation during a replacement procedure. It is a desire with this type of mounting that each arm be contained between symmetrically identical assemblies. This arrangement allows for manufacture of the required components in pairs which allows for economical manufacture of the resultant harvesting machine.

Figure 13A:
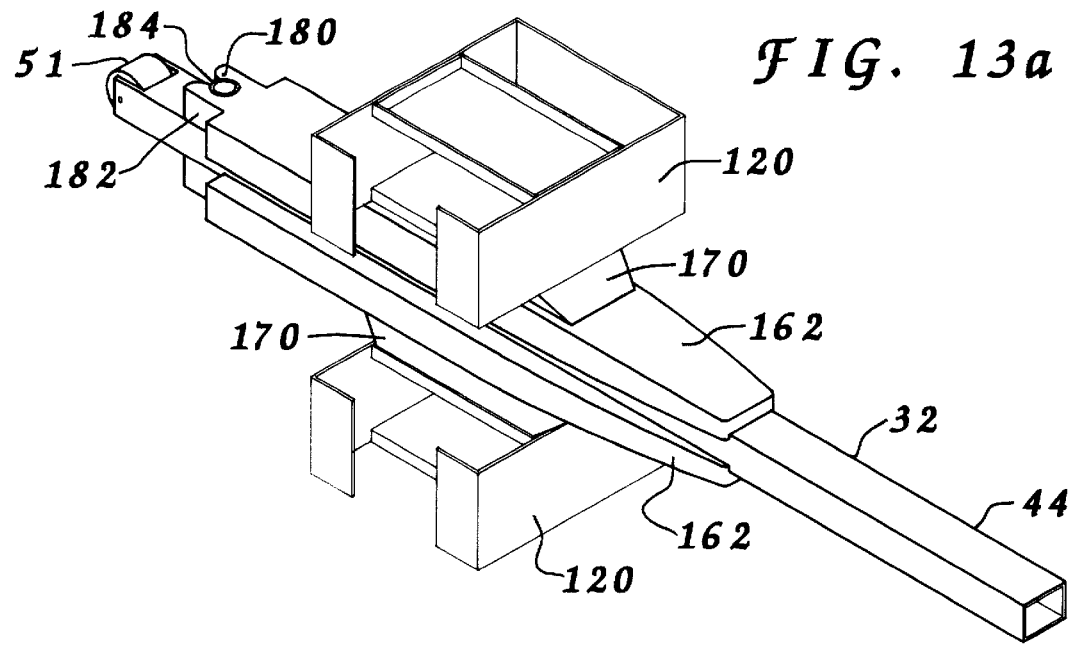
FIG. 13a is an assembled perspective view of the arm mounting assembly depicted in FIG. 12.
Figure 13B:
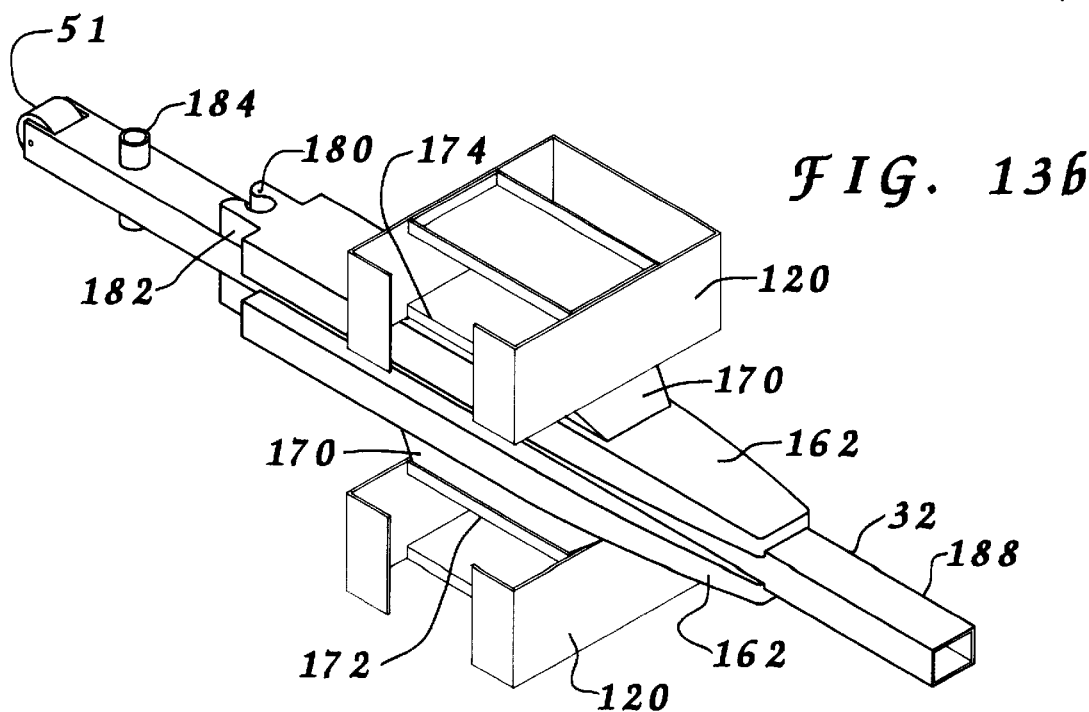
FIG. 13b is a perspective view of the arm mounting assembly depicted in FIG. 13a in an alternative orientation.

FIG. 13b depicts the beginning of removal of arm 32 from guides 162 which in turn will release guides 162 which in turn will release opposing resilient blocks 170 from lower pan 174 and upper pan 172 respectively. At that time any of the removable components which are damaged may easily be replaced with spare components. At that time one (1) resilient block 170 would be placed in upper pan 172, one (1) guide 162 would be placed on the previously positioned resilient block 170 with guide track 164 disposed upwardly, a second resilient block 170 would be positioned on a second guide 162 with guide track 164 disposed downwardly, that combination would be manually positioned with resilient block 170 in lower pan 174 and manually retained therein while arm 32 is inserted in between opposing guide tracks 164 wherein the assembly would be held in place. Arm 32 would then be moved to deployed position 44.

Fruit Catcher Assembly

It is preferred, during harvesting using a fruit harvesting machine having features of the instant invention, that the harvested fruit be gathered prior to contact thereby with the earthen ground. Alternatively, the harvested fruit may be allowed to free fall onto the earthen ground for subsequent gathering by any of the methods conventionally known in the art.

A fruit catcher assembly applicable to the instant invention may move along with the transport assembly at a stationary deployed position under the trees. Preferably, the fruit catcher assembly moves inward toward the base of the tree simultaneously with the extension period of the arm housing member and outward away from the tree simultaneously with the withdrawal period of the arm housing member. This arrangement provides for the collected fruit to be within the general confines of the transport assembly during advancement of the transport assembly for a subsequent harvesting cycle. During this time frame the collected fruit may be mechanically disposed to a secondary collection area for subsequent handling. This arrangement also eliminates the opportunity for damage to occur to the base of the tree during advance of the transport assembly.

The harvesting of fruit utilizing a harvesting machine having features of the instant invention produces a picking pressure during withdrawal of the arms from the tree. This action tends to cause the fruit to move toward the harvesting machine immediately following the severing action or to fall straight downward amongst the arms. A very small percentage of the fruit tends to fall away from the harvesting machine. It is preferred to provide for the fruit catcher assembly not to impact the trunk of the tree during extension theretoward. It is preferred that the picking finger closest to the distal end of the arms extend at least to the center line of the respective tree to ensure complete coverage of the tree. Therefore, it is preferred that the arms will extend beyond the outermost extent of the fruit catcher assembly. Alternatively, it is possible to provide for the outward advance of the fruit catcher assembly to stop before the outward advance of the array of arms and for the inward advance of the fruit catcher assembly to begin following the inward advance of the array of arms. This arrangement provides for exposing ample collection area within the fruit catcher assembly while reducing the probability of damage to the trunk of the tree.

It is a strong desire that the assembly of the general fruit catcher assembly which extends beneath the tree make such penetration at the lowest possible elevational position relative to the tree. This reduces any tendency to sever low hanging fruit from the tree prior to harvesting proper by the harvesting machine. This also reduces the danger of damaging the tree by forcing branches inward toward the trunk of the tree where such movement may cause breaking of the branches. It is also a strong desire that the assembly which catches the fruit be elevated above ground level prior to advancement of the harvesting machine. These desires may be fulfilled by providing for a lowering of the assembly which catches the fruit at the beginning of a cycle of extension and withdrawal and raising the assembly prior to advancing the harvesting machine to the next location of placement relative to the row of trees. This arrangement of elevation simplifies the removal of the harvested fruit from the assembly by allowing a secondary transfer assembly to be at an equal or lower elevational orientation to the assembly.

Numerous methods exist to cause movement of spherical elements toward a collection area. These are exampled by conveyor belts along the floor of the assembly and spaced transversing bars which move above the floor assembly. Any conventionally known method may be employed to facilitate transfer of the fruit from the assembly to the secondary transfer assembly. Similar methods may be employed to transfer the harvested fruit through the secondary transfer assembly to a destination.

The secondary transfer assembly may deposit the harvested fruit into containers, as exampled by tubs or boxes, which are carried by the harvesting machine. Alternatively, the harvested fruit may be directly transferred to a transport vehicle which would advance with the harvesting machine.

When the containers are carried by the harvesting machine, it is desirable to have an active container being utilized to retain the harvested fruit retained on the harvesting machine in close elevational proximity to the ground in a loading position. This elevational orientation allows for an easy transfer of a full container from the loading position to the ground. Preferably, the harvesting machine carries a plurality of empty containers with a device to provide for transfer of one of the empty containers to the loading position contemporaneously with release of the previously filled container. A pause in transfer of the harvested fruit is desirable during transfer of the filled container to the ground and during transfer of an empty container to the loading position.

FIG. 1 through FIG. 6 depict harvesting machine 30 having a fruit catcher assembly 190 installed thereon. Fruit catcher assembly 190 comprises a pan 192, a lift assembly 194 and a secondary transfer assembly 196. Pan 192 is held in an elevated position 198 relative to harvesting machine 30 during transfer of collected fruit, not shown, from pan 192 to secondary transfer assembly 196. Pan 192 is mounted to be displaced simultaneously with arm housing member 110 during each cycle of extension and retraction while in a lowered position 200. Pan 192 preferably has a contour 202 at a forward extent 204 to enhance sliding properties along ground 206.

Lift assembly 194 provides for transfer of pan 192 between elevated position 198 and lowered position 200. Such transfer only occurring while pan 192 is positioned below transport assembly 122 of harvesting machine 30. Opposing extension members 208 provide for connecting lift assembly 194 to arm housing member 110.

An access panel 210 in pan 192 opens while in elevated position 198 to provide for transfer of collected fruit from pan 192 to secondary transfer assembly 196 for subsequent passage through an output opening 212 and into a collection container, not shown.

Harvesting Process

Experimentation has proven that a high percentage of fruit may be harvested from trees utilizing a single cycle of extension and withdrawal at each location along the row of trees. Occasionally, it may be desired to make at least one subsequent cycle at each location along the row of trees to harvest an even higher percentage of the fruit. Alternatively, it is possible to provide for advancement of the harvesting machine by a fraction of full advancement along the row. One example of such fractional advancement being one half of the full advancement. This provides for an overlapping of harvesting producing double coverage of any select area on the row while utilizing a single harvesting cycle during each positional displacement.

Referring now to FIG. 1 through FIG. 6, in usage, harvesting machine 30 would be positioned adjacent to row 130 of grove 128 in a harvesting position 214. Preferably, a spacing of a free space 216 would exist between tree 36 and distal end 40 of arms 32 while arm housing member 110 is in a retracted position 218. This positioning provides the greatest possibility to harvest outer fruit, and particularly low hanging outer fruit, from tree 36 by providing for additional withdrawal area adjacent tree 36. Once in harvesting position 214 arm housing member 110, and therefore array 112 of arms 32, is moved from retracted position 218 to an extended position 220 and from extended position 220 to retracted position 218. This transfer completes one harvesting cycle. If desired, subsequent cycles may be performed. Following a completion of harvesting at harvesting position 214, harvesting machine 30 is advanced along row 130 a distance no greater than the width of array 112 and preferably a distance slightly less than the width of array 112. This ensures an overlapping of harvesting by each cycle. If fruit catcher assembly 190 is provided the harvested fruit is conveyed out of the collection area during advancement of harvesting machine 30.

Automation of Harvesting Process

It is preferred, in order to increase efficiency of the harvesting machine, to automate the harvesting process. Numerous methods are known in the art to regulate mechanical devices during operation and many of these methods may be employed with the instant invention.

The automation of the harvesting process requires mechanical control over subsequent placement of the machine following each harvesting cycle. Similarly, it is required that mechanical control be exerted over the actual harvesting cycle of extension and withdrawal of the arms from the canopy of the tree. If a catcher assembly is present, it is required that the transfer of the harvested fruit must be mechanically controlled. In order to maximize productivity, it is required that intricate control be maintained over all mechanical functions of the harvesting machine to reduce wasted time. Various safety overrides may be provided to allow the operator to interrupt the various mechanical functions during automated operation of the harvesting machine.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fruit harvesting machine comprising:

a) a transport assembly;

b) transport means to provide for motion of the transport assembly through a fruit grove, the fruit grove having a plurality of rows with each row having a linear alignment of a plurality of fruit trees, the fruit grove having a plurality of adjacent rows, at least some adjacent rows having a passageway therebetween of sufficient width to provide for passage of the fruit harvesting machine therethrough;

c) a plurality of picking fingers, each picking finger to provide for an engagement of a select fruit tree within the fruit grove, the engagement occurring in close proximity to a fruit situated on the select fruit tree, the engagement occurring during a movement of the picking finger relative to the select fruit tree, the movement of the picking finger capable of producing a picking pressure between the picking finger and the fruit during subsequent movement of the picking finger relative to the select fruit tree subsequent to the engagement;

d) a plurality of arms, each arm having a longitudinal length and at least one of the picking fingers extending therefrom;

e) an arm housing member mounted on the transport assembly, the arm housing member to provide for a containment of an array of the plurality of arms, each arm having a deployed position relative to the arm housing member, the containment having a pattern, the pattern providing for all adjacent arms to have a like directional orientation along the longitudinal length of each arm, the pattern having a horizontal height and a vertical width;

f) a scissor extension member to provide for a displacement of the arm housing member relative to the transport assembly and alternatingly between a retracted orientation and an extended orientation, the displacement generally aligned with the longitudinal length of the arms, the scissor extension member comprising a first coupling assembly, a second coupling assembly and drive means, the first coupling assembly and the second coupling assembly mounted on the fruit harvesting machine in a spaced relationship, the displacement having an extension period and a withdrawal period, the drive means to provide for a powering of the scissor extension member during the extension period and during the withdrawal period, the extension period moving the arm housing member away from the retracted orientation and toward the extended orientation, the withdrawal period moving the arm housing member away from the extended orientation and toward the retracted orientation, the engagement of the select fruit tree by the picking fingers occurring during the withdrawal period, the first coupling assembly and the second coupling assembly each comprising:

1) a first connection member situated on the transport assembly;

2) a second connection member situated on the transport assembly in spaced relationship to the first connection member;

3) a third connection member situated on the arm housing member;

4) a fourth connection member situated on the arm housing member in spaced relationship to the third connection member;

5) at least two linking members each having opposing ends, each of the connection members contacting one of the linking members in close proximity to one of the ends;

6) two sliding members each to provide for a movement of one of the linking members, each sliding member contacting one of the connection members;

7) linking means to provide for a pivotal connection of each of the linking members to at least one other linking member wherein the linking members and the linking means provide for a cooperation between the first connection member, the second connection member, the third connection member, the fourth connection member and the two sliding members, the cooperation to provide for the displacement of the arm housing member relative to the transport assembly;

g) insertion yield means to provide for at least a partial yielding during the extension period of the displacement of a select impacted arm relative to the arm housing member from the deployed position during an impaction of an impacted obstruction by the select impacted arm, the select impacted arm returning to the deployed position following the withdrawal period of the displacement.

2. The fruit harvesting machine defined in claim 1 wherein the sliding members are each situated on the transport assembly and the arm housing member respectively.

3. The fruit harvesting machine defined in claim 1 wherein the sliding members are each situated on one of the linking members.

4. The fruit harvesting machine defined in claim 1 wherein the first connection member and the second connection member of each of the coupling assemblies are generally vertically disposed on the transport assembly in spaced relation and the third connection member and the fourth connection member of each of the coupling assemblies are generally vertically disposed on the arm housing member in spaced relation.

5. The fruit harvesting machine defined in claim 1 wherein the first coupling assembly and the second coupling assembly are positioned on opposing lateral sides of the arm housing member in spaced relation.

6. The fruit harvesting machine defined in claim 1 wherein the drive means comprises hydraulic drive units.

7. The fruit harvesting machine defined in claim 1 wherein the fruit is a citrus fruit.

8. A fruit harvesting machine comprising:
   a) a transport assembly;
   b) transport means to provide for motion of the transport assembly through a fruit grove, the fruit grove having a plurality of rows with each row having a linear alignment of a plurality of fruit trees, the fruit grove having a plurality of adjacent rows, at least some adjacent rows having a passageway therebetween of sufficient width to provide for passage of the fruit harvesting machine therethrough;
   c) a plurality of picking fingers, each picking finger to provide for an engagement of a select fruit tree within the fruit grove, the engagement occurring in close proximity to a fruit situated on the select fruit tree, the engagement occurring during a movement of the picking finger relative to the select fruit tree, the movement of the picking finger capable of producing a picking pressure between the picking finger and the fruit during subsequent movement of the picking finger relative to the select fruit tree subsequent to the engagement;
   d) a plurality of arms, each arm having a longitudinal length and at least one of the picking fingers extending therefrom;
   e) an arm housing member mounted on the transport assembly, the arm housing member to provide for a containment of an array of the plurality of arms, each arm having a deployed position relative to the arm housing member, the containment having a pattern, the pattern providing for all adjacent arms to have a like directional orientation along the longitudinal length of each arm, the pattern having a horizontal height and a vertical width;
   f) displacement means to provide for a displacement of the arm housing member relative to the transport assembly and alternatingly between a retracted orientation and an extended orientation, the displacement generally aligned with the longitudinal length of the arms, the displacement having an extension period and a withdrawal period, the engagement of the select fruit tree by the picking fingers occurring during the withdrawal period;
   g) a plurality of deflection yield members, each deflection yield member to house a received arm, the received arm being one of the plurality of arms, each deflection yield member to provide for a deflection yielding of the received arm during the displacement, each deflection yield member comprising:
      1) a housing situated on the arm housing member;
      2) a mount to provide for containment of the received arm;
      3) resilient coupling means to provide for flexibly connecting the mount to the housing wherein the mount may move radially in response to a deflecting pressure within the housing during contact by the received arm with a contacted obstruction during the displacement of the received arm;
   h) insertion yield means to provide for at least a partial yielding during the extension period of the displacement of a select impacted arm relative to the arm housing member from the deployed position during an impaction of an impacted obstruction by the select impacted arm, the select impacted arm returning to the deployed position following the withdrawal period of the displacement.

9. The fruit harvesting machine defined in claim 8 wherein the resilient coupling means comprises a resilient block formed of a resilient material having characteristics which permit compression and expansion thereof.

10. The fruit harvesting machine defined in claim 8 wherein the resilient coupling means comprises opposing resilient blocks, each resilient block formed of a resilient material having characteristics which permit compression and expansion thereof.

11. The fruit harvesting machine defined in claim 8 wherein the mount comprises opposing guide members, each guide member having a longitudinal length with a track extending therealong, the track to provide for housing the received arm, the tracks of the opposing guide members facing each other while housing the received arm.

12. The fruit harvesting machine defined in claim 8 wherein the mount of each deflection yield member is retained within a respective housing in response to a retaining pressure created by contact between the received arm and the mount.

13. The fruit harvesting machine defined in claim 8 wherein the housings of the deflection yield members are rigidly contained in an array within the arm housing member.

14. The fruit harvesting machine defined in claim 8 wherein the fruit is a citrus fruit.

15. A fruit harvesting machine comprising:
   a) a transport assembly;
   b) transport means to provide for motion of the transport assembly through a fruit grove, the fruit grove having a plurality of rows with each row having a linear alignment of a plurality of fruit trees, the fruit grove having a plurality of adjacent rows, at least some adjacent rows having a passageway therebetween of sufficient width to provide for passage of the fruit harvesting machine therethrough;
   c) a plurality of picking fingers, each picking finger to provide for an engagement of a select fruit tree within the fruit grove, the engagement occurring in close proximity to a fruit situated on the select fruit tree, the engagement occurring during a movement of the picking finger relative to the select fruit tree, the movement of the picking finger capable of producing a picking pressure between the picking finger and the fruit during subsequent movement of the picking finger relative to the select fruit tree subsequent to the engagement;

d) a plurality of arms, each arm having a longitudinal length and at least one of the picking fingers extending therefrom;

e) an arm housing member mounted on the transport assembly, the arm housing member to provide for a containment of an array of the plurality of arms, each arm having a deployed position relative to the arm housing member, the containment having a pattern, the pattern providing for all adjacent arms to have a like directional orientation along the longitudinal length of each arm, the pattern having a horizontal height and a vertical width;

f) displacement means to provide for a displacement of the arm housing member relative to the transport assembly and alternatingly between a retracted orientation and an extended orientation, the displacement generally aligned with the longitudinal length of the arms, the displacement having an extension period and a withdrawal period, the engagement of the select fruit tree by the picking fingers occurring during the withdrawal period;

g) a plurality of arm breakaway members, each arm breakaway member to house a received arm being one of the plurality of arms and provide for an extension yielding during the extension period of the displacement, each arm breakaway member comprising;

1) a guide to provide for an attachment of the received arm to the arm housing member, the received arm slidable within the guide, the guide continually applying an opposing bearing pressure to the received arm;

2) a first locking member attached in close proximity to a terminal end of the received arm;

3) a second locking member attached in close proximity to the guide, the first locking member and the second locking member having a locked position wherein the first locking member and the second locking member cooperate to retain the received arm in the deployed position relative to the arm housing member, the first locking member and the second locking member releasable following reaching a predetermine level of a resistance during the extension period of the displacement, the resistance indicative of an impaction by the received arm with an impacted obstruction, the received arm returning to the deployed position following the withdrawal period of the displacement with the first locking member and the second locking member then again cooperating to retain the received arm in the deployed position relative to the arm housing member.

16. The fruit harvesting machine defined in claim 15 wherein a contact member contacts each received arm during the withdrawal period to ensure that the first locking member and the second locking member are in the locked position.

17. The fruit harvesting machine defined in claim 15 wherein the first locking member of each arm breakaway member further comprises opposing bar extensions extending generally perpendicularly from the respective received arm and the second locking member of each arm breakaway member further comprises opposing grooved securement members disposed on opposing sides of the guide and wherein each bar extension engages a respective grooved securement member to obtain the locked position.

18. The fruit harvesting machine defined in claim 15 wherein the guide of each arm breakaway member further comprises a first mounting member and a second mounting member each substantially identical, each mounting member having an arm receiving track therein of a depth that when the received arm is contained therein that any picking fingers extending therefrom may pass between the first mounting member and the second mounting member during a sliding motion of the received arm between the first mounting member and the second mounting member.

19. The fruit harvesting machine defined in claim 15 wherein the fruit is a citrus fruit.

* * * * *